(12) United States Patent
Martin

(10) Patent No.: US 12,105,364 B1
(45) Date of Patent: Oct. 1, 2024

(54) DEVICE FOR TREATING AMBLYOPIA/ANISOMETROPIA

(71) Applicant: Gordon R. Martin, Gleneden Beach, OR (US)

(72) Inventor: Gordon R. Martin, Gleneden Beach, OR (US)

( * ) Notice: Subject to any disclaimer, the term of this patent is extended or adjusted under 35 U.S.C. 154(b) by 0 days.

(21) Appl. No.: 18/222,378

(22) Filed: Jul. 14, 2023

(51) Int. Cl.
    *G02C 7/16*     (2006.01)

(52) U.S. Cl.
    CPC ..................... *G02C 7/16* (2013.01)

(58) Field of Classification Search
    CPC ........................................... G02C 7/16
    USPC .................................... 351/41, 158
    See application file for complete search history.

(56) References Cited

U.S. PATENT DOCUMENTS

| | | | | |
|---|---|---|---|---|
| 6,971,744 B1* | 12/2005 | Cummings | .............. | G02C 9/04 351/57 |
| 7,147,320 B2* | 12/2006 | Werner | .................. | G02C 5/003 351/53 |
| 7,201,479 B2* | 4/2007 | Spitzer | .................. | G02C 11/00 351/158 |
| 10,279,237 B2* | 5/2019 | Glynn | ...................... | G02C 7/16 |

\* cited by examiner

*Primary Examiner* — Tuyen Tra
(74) *Attorney, Agent, or Firm* — Klarquist Sparkman LLP

(57) ABSTRACT

The disclosure is directed to devices for training the human brain to overcome the effects of amblyopia. Some examples include a divider placed between the left eye and the right eye of a user or wearer. Such examples reduce the portion of a user's field of vision of each eye that overlaps, which in turn reduces the degree to which the brain can rely on input from the dominant eye to compensate for poor vision in the weak eye. Some examples include an obstruction element that covers a portion of the field of vision of the dominant eye. Such devices convert binocular fields of view into bi-monocular fields of view. Such devices help a user to overcome the effects of amblyopia by training the brain to better utilize and integrate visual information from the weak eye.

5 Claims, 24 Drawing Sheets

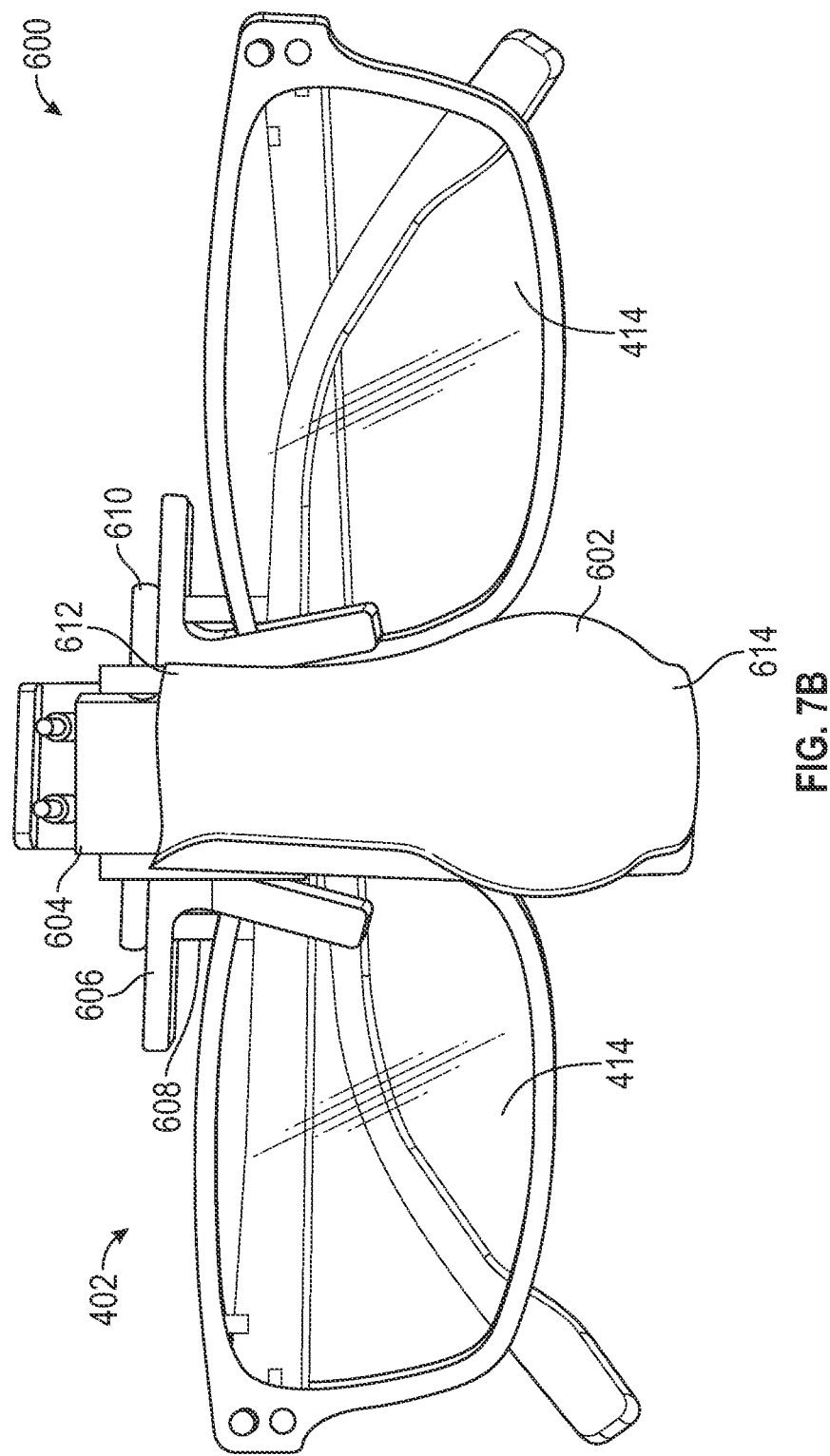

DEVICE FOR TREATING AMBLYOPIA/ANISOMETROPIA

FIELD

This disclosure relates generally to devices for training brain-eye cooperation in patients suffering from amblyopia, and methods for using the same.

BACKGROUND

The left eye and the right eye of a human produce slightly different and partially overlapping fields of view. In a typical human, each eye produces a field of view of approximately 150°, with an overlapping arc of approximately 120°, and approximately 30° of non-overlapping field of view for each eye. The overlapping 120° field of view is sometimes referred to as the binocular vision field, and the non-overlapping portions are sometimes referred to as the left and right monocular fields of view. Humans rely primarily on the binocular field of view, relying on monocular fields of view only for peripheral vision. The partial overlapping of the left and right eye fields of view affords improved depth of field perception in the binocular field of view. However, humans may also suffer from various conditions that can impede one eye and may cause an overreliance on a stronger (or dominant) eye over a weaker eye.

Amblyopia is a vision condition that typically develops due to a breakdown in the coordination between the brain and eye, wherein the brain experiences difficulty recognizing and utilizing visual information from one eye. Over time, the brain increasingly relies on visual information from the stronger (that is, the dominant) eye. As the brain increasingly relies on visual information from the stronger eye, vision in the weak eye continues to deteriorate, along with the ability of the brain to recognize visual information from the weak eye, and to integrate visual information from the weak eye and the dominant eye.

SUMMARY

Disclosed herein are devices to support an eye-brain training process (EBTP) for training the human brain to better utilize a weaker (or amblyopic) eye. EBTP and its associated devices convert binocular vision into two separate fields of monocular vision (sometimes referred to as bi-monocular vision) for training an amblyopic eye. The disclosed devices can include physical dividers positioned between the left eye and the right eye to artificially separate the binocular field of view into two monocular fields. In other examples, the disclosed devices can partially obscure the field of vision of one eye by covering a portion of an article of eyewear, such as glasses or sunglasses. In both cases, the brain is prevented from compensating for weak vision in one eye with the overlapping portion of the field of view of the other eye by separating the left and right monocular fields of view. Thus, the brain can be trained to use the monocular field of view from the weak eye.

Certain examples concern an article of eyewear. The article of eyewear comprises a glasses frame having a first lens rim, second lens rim, and a bridge member extending between the first lens rim and the second lens rim. The article of eyewear also comprises a first lens disposed within the first lens rim and a second lens disposed within the second lens rim. The article of eyewear also comprises a field of view divider attached to the glasses frame and configured to at least partially obscure the field of view of a user when the article of eyewear is worn.

Certain examples concern a vision training device. The vision training device comprises an article of headgear and an obstructor comprising a horizontal member affixed to the article of headgear and a vertical member extending from the horizontal member. The vertical member is configured to extend along a nose of a user when the article of headgear is worn.

Certain examples concern a nasal prosthetic. The nasal prosthetic comprises a first prosthetic layer having a first thickness, a front side, and a back side. The nasal prosthetic also comprises an adhesive layer disposed on the back side of the first prosthetic layer. The nasal prosthetic is configured to be worn against a nasal bridge of a user with the back side of the nasal prosthetic facing the nasal bridge of the user. When the nasal prosthetic is worn, the adhesive layer secures the first prosthetic layer to the nasal prosthetic. The first prosthetic layer at least partially obscures the field of view of the left eye or the right eye of the user.

Certain examples concern an eye brain training process device. The eye brain training process device comprises a tubular member having a first end portion, a second end portion, a wall portion, a lumen extending from the first end portion to the second end portion, and an axial slit extending through the wall portion and extending from the first end portion to the second end portion. The eye brain training process device also comprises a vision obstructor attached to the tubular member and extending tangentially away from the tubular member. The tubular member is configured to receive an edge portion of an article of eyewear such that the vision obstructor is positioned along a front portion of the article of eyewear. The position of the vision obstructor relative to the article of eyewear can be adjusted laterally relative to the article of eyewear by moving the tubular member laterally.

Certain examples concern an eye brain training process device. The eye brain training process device comprises a vision obstructor. The eye brain training process device also comprises a brace configured to attach the vision obstructor to an article of eyewear. The brace is configured to receive an edge portion of the article of eyewear such that the vision obstructor is positioned along a front portion of the article of eyewear. The vision obstructor is movable between a first configuration in which the vision obstructor extends laterally along a lens of the article of eyewear and a second configuration in which the vision obstructor extends frontally from the article of eyewear.

The foregoing and other objects, features, and advantages of the invention will become more apparent from the following detailed description, which proceeds with reference to the accompanying figures.

BRIEF DESCRIPTION OF THE DRAWINGS

FIG. 7B is a front view of the eye-brain training process device of FIG. 7A with the vision obstruction member in an undeployed position.

DETAILED DESCRIPTION

Introduction to the Disclosed Technology

Figure 1A:
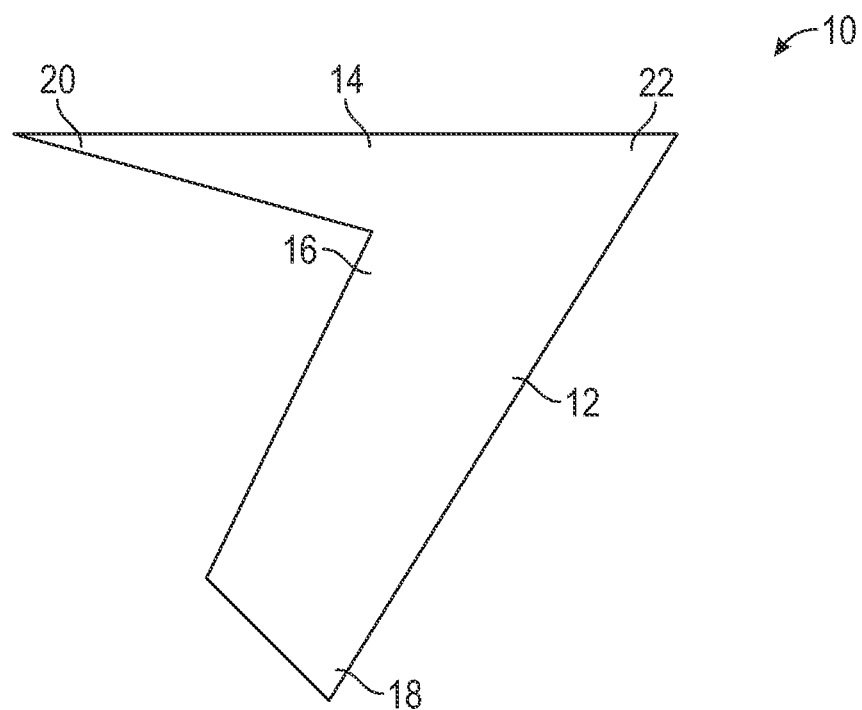
FIG. 1A is a side view of a field of vision divider according to one example.

The human brain produces vision images by incorporating visual information from both the left eye and the right eye into a single visual composite. In an individual with normally operational vision, the cerebral cortex simultaneously receives an image from each of the left eye and the right eye and completes the holistic field of view with details from each image. In some cases, individuals may not fully employ the ability of the cerebral cortex to fuse images from the left eye and the right eye but may instead predominantly rely on the image from whichever eye is stronger (that is, the dominant eye), supplemented by image information from the weaker eye.

Amblyopia (also called lazy eye) is a developmental condition in which there is deficiency in the coordination between the brain and the eye. This in turn reduces the brain's ability to recognize vision from the deficient eye and causes increased reliance on the dominant eye. As the brain increasingly relies on vision from the dominant eye, the vision in the weak eye further deteriorates. The deterioration of the weaker eye can further cause eye strain in the dominant eye, worsening overall vision, and headaches, among other symptoms.

Conventional therapy methods for correcting amblyopia are primarily focused on covering or patching the dominant eye or using shaded lenses to partially or completely eliminate the contribution of the dominant eye to the patient's vision. This in turn forces the weak eye to work harder to compensate for the partial or complete loss of vision in the dominant eye, in theory strengthening the vision of the weak eye. However, these methods may be inadequate for patients with sufficiently advanced amblyopia that the weak eye is incapable of providing an operable level of vision on its own.

Moreover, these conventional therapy methods may be inadequate in conditioning the brain to use and properly blend imagery from the weak eye with imagery from the dominant eye. Thus, even if successful in strengthening the weak eye, such therapy methods may remain unsuccessful in conditioning the brain to use imagery from both the weak eye and the dominant eye to provide a complete vision image.

The Eye/Brain Training Process (EBTP) method and devices described herein, in contrast, provide adjustable fields of view to the dominant and/or the weak eye of a person with amblyopia. By controlling the fields of view available to each eye, the brain can be conditioned to increasingly rely on image information from the weak eye, while still receiving information from the dominant eye. In turn, this requires the brain to simultaneously use images from both eyes, and to complete each existing field of view as it comes into view to both eyes. Thus, the EBTP methods and devices disclosed herein can condition both the eyes and the brain of the user by limiting disuse of the weak eye, and by improving the ability of the brain to combine image data from both the weak and dominant eye.

Examples of the Disclosed Technology

Some example devices for EBTP disclosed herein function by placing an obstruction between the right eye and the left eye, such as along the bridge of a user's nose. These devices convert the binocular field of human vision into two separated monocular fields of view (sometimes, this may be referred to as a bi-monocular field of view). This partially reduces the portion of the field of view shared by the dominant eye and the weak eye, and in turn forces the brain to use more of the image from the weak eye in forming a full field of view and can train the brain to more readily receive and process vision information for the weak eye.

Figure 1B:
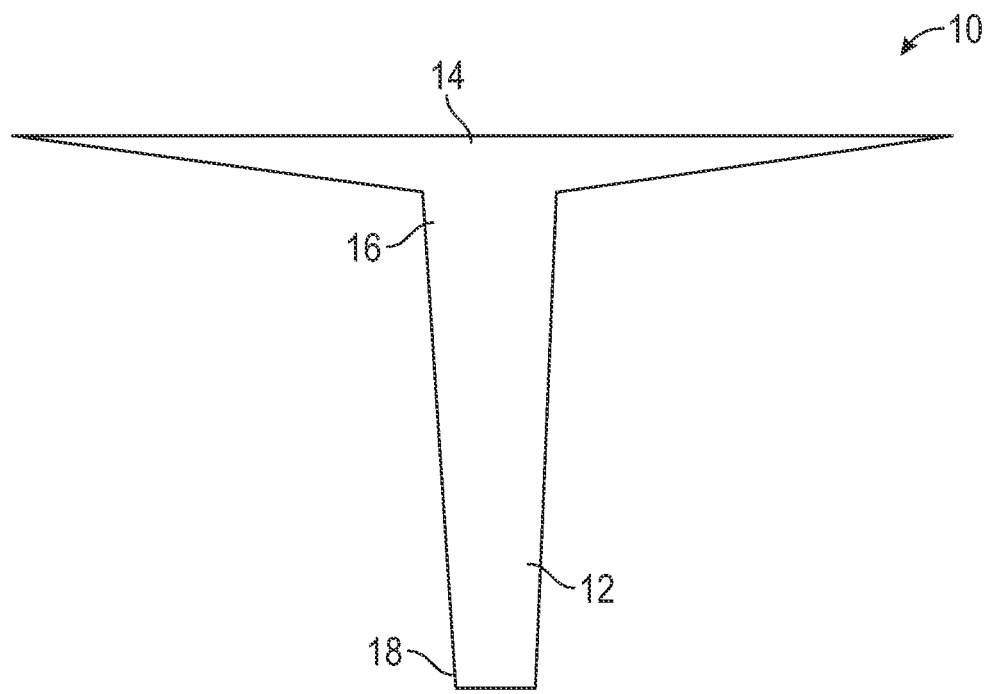
FIG. 1B is a front view of the field of vision divider of FIG. 1A.

FIGS. 1A and 1B show an example vision divider 10 for use with an article of headwear. The vision divider 10 can, in the example shown, place an obstruction between the left eye and the right eye of a user, obstructing or partially obstructing the field of view of one or both eyes. The vision divider 10 incudes a nose bridge member 12 and a visor attachment member 14. As shown in FIG. 1A, the nose bridge member 12 can comprise a first end portion 16 and a second end portion 18, and the visor attachment member 14 can comprise a frontal projection 20 and a rear end portion 22.

As shown in the illustrated example, the first end portion 16 of the nose bridge member 12 can connect to the visor attachment member 14 at or near the frontal projection 20. The nose bridge member 12 can extend away from (that is, downwards) from the visor attachment member 14 as shown in FIGS. 1A and 1B. In some examples, such as the one illustrated, the nose bridge member 12 can also be swept forwards, such that it extends towards the frontal projection 20 of the visor attachment member 14. In some examples, as shown in FIG. 1B, the nose bridge member 12 can have a taper, such that the nose bridge member 12 is wider at the first end portion 16 and narrower at the second end portion 18, but it is to be understood that in other examples, the width of the nose bridge member 12 can be substantially similar at the first end portion 16 and the second end portion 18, or can be wider at the second end portion 18 than at the first end portion 16.

Figure 1C:
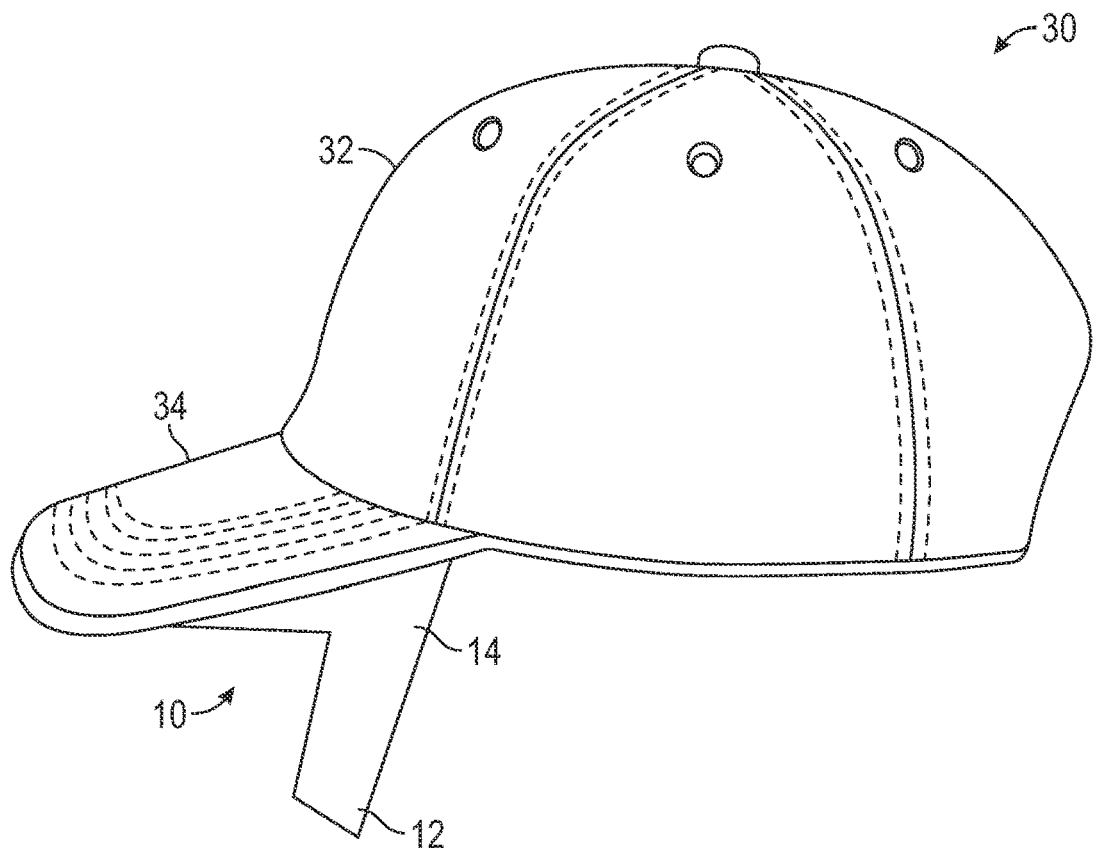
FIG. 1C is a side view of the field of vision divider of FIG. 1A attached to a bill cap.
Figure 1D:
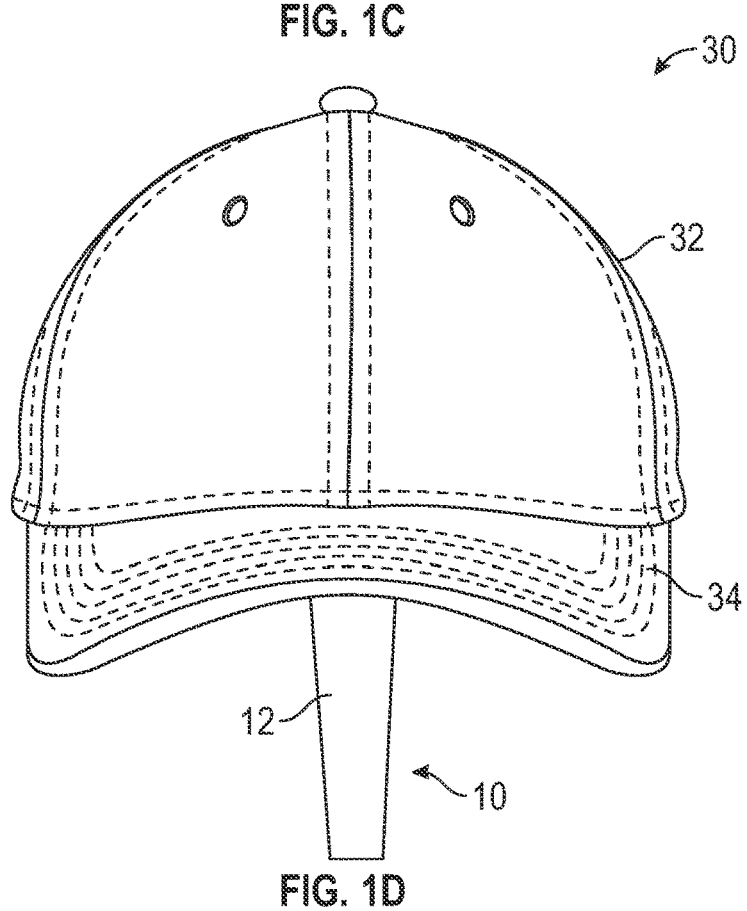
FIG. 1D is a front view of the field of vision divider of FIG. 1A attached to a bill cap.

In some examples, the vision divider 10 can be attached to an article of headgear, such as the bill cap 30 shown in FIGS. 1C and 1D. The bill cap 30 can comprise a cap portion 32 and a bill portion 34 projecting forwards from the cap portion 32. The visor attachment member 14 can, in such examples, be attached to the bill portion 34 of the bill cap 30 such that the vision divider 10 hangs or extends downwards from the bill portion 34, as illustrated. Thus, when the bill cap 30 with the attached vision divider 10 is worn, the nose bridge member 12 can hang in front of the face of the wearer, such as over the nose of the wearer.

In this way, the nose bridge member 12 of the vision divider 10 can artificially "extend" the bridge of the wearer's nose. This provides an obstruction between the left and right fields of vision, and thus further separates the images in the weak eye and the dominant eye and requires the brain to use a greater portion of the image from the weak eye in forming the full field of view.

In specific examples, the thickness T1 of the nose bridge member 12 of the vision divider 10 can be greater than 5 millimeters, such as from greater than 5 millimeters to 25 millimeters.

In some examples, the nose bridge member 12 can also be repositioned to the left or to the right, to allow the dominant eye to be partially covered or obscured by the nose bridge member 12, further increasing the portion of the field of view which must be completed using the image from the weak eye, and the degree to which the wearer's brain must blend or combine the images from the dominant eye or the weak eye.

Figure 2A:
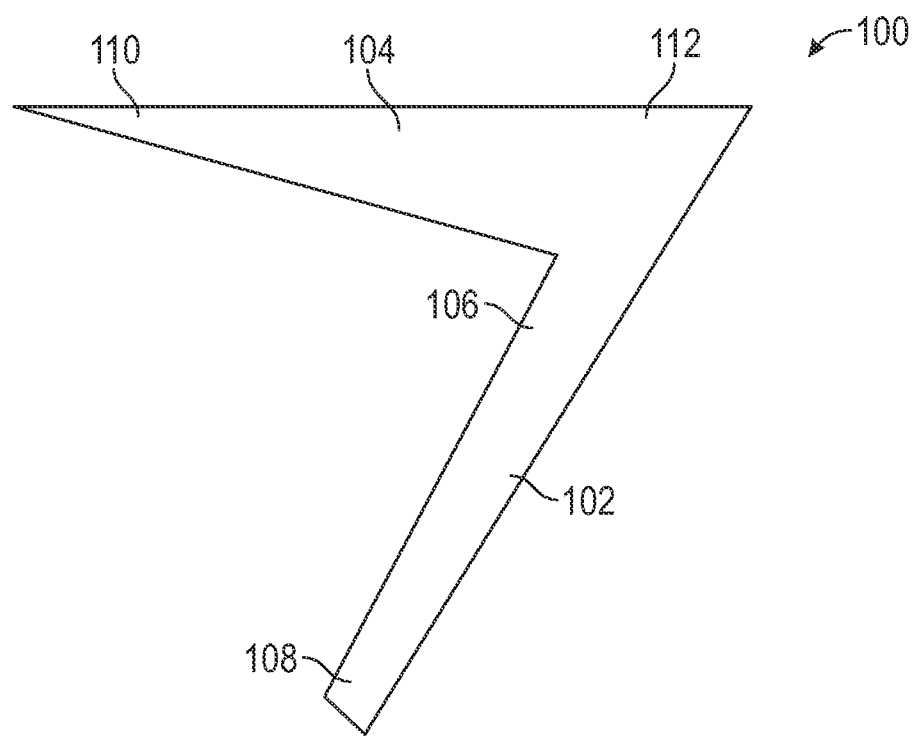
FIG. 2A is a side view of a field of vision divider according to another example.
Figure 2B:
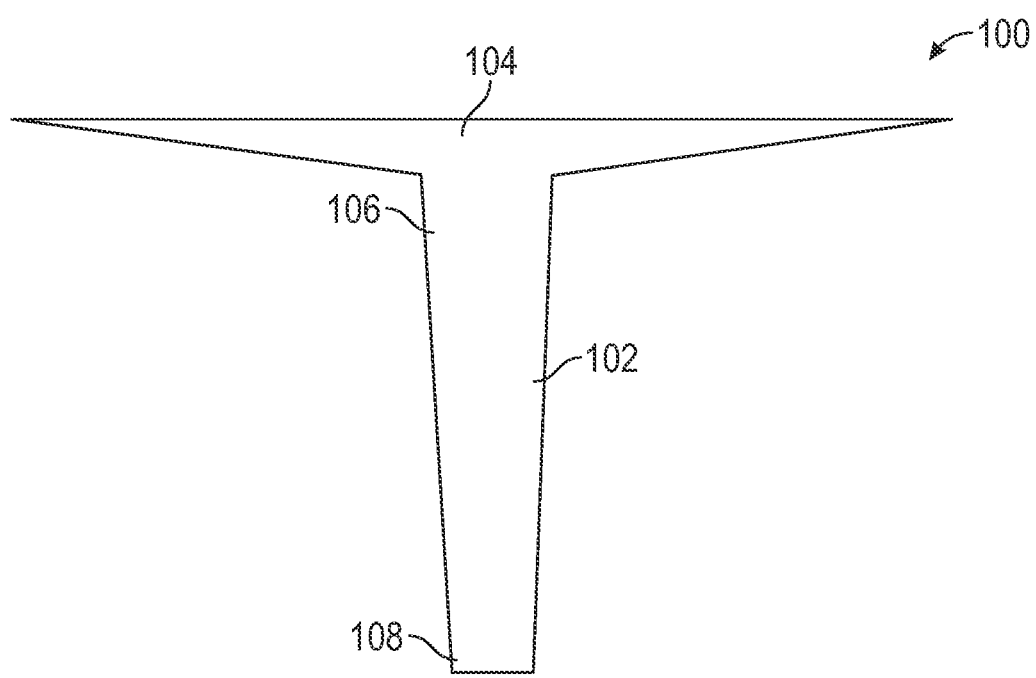
FIG. 2B is a front view of the field of vision divider of FIG. 2A.

FIGS. 2A-2B show a vision divider 100 according to another example. The vision divider 100 can comprise a nose bridge member 102 and a visor attachment member 104. As shown in FIG. 2A, the nose bridge member 102 can comprise a first end portion 106 and a second end portion 108, and the visor attachment member 104 can comprise a frontal projection 110 and a rear end portion 112.

As shown in the illustrated example, the first end portion 106 of the nose bridge member 102 can connect to the visor attachment member 104 at or near the rear end portion 112. The nose bridge member 102 can extend away from (that is, downwards) from the visor attachment member 104 as shown in FIGS. 2A and 2B. In some examples, such as the one illustrated, the nose bridge member 102 can also be swept forwards, such that it extends towards the frontal projection 110 and away from the rear end portion 112 of the visor attachment member 104. In some examples, as shown in FIG. 2B, the nose bridge member 102 can have a taper, such that the nose bridge member 102 is wider at the first end portion 106 and narrower at the second end portion 108, but it is to be understood that in other examples, the width of the nose bridge member 102 can be substantially similar at the first end portion 106 and the second end portion 108, or can be wider at the second end portion 108 than at the first end portion 106.

As indicated in FIG. 2A, a thickness T2 of the nose bridge member 102 can be less than a thickness T1 of the nose bridge member 12 (illustrated in FIG. 1A). This allows for a lesser degree of visual obstruction and separation of the fields of view of the weak eye and the dominant eye.

Figure 2C:
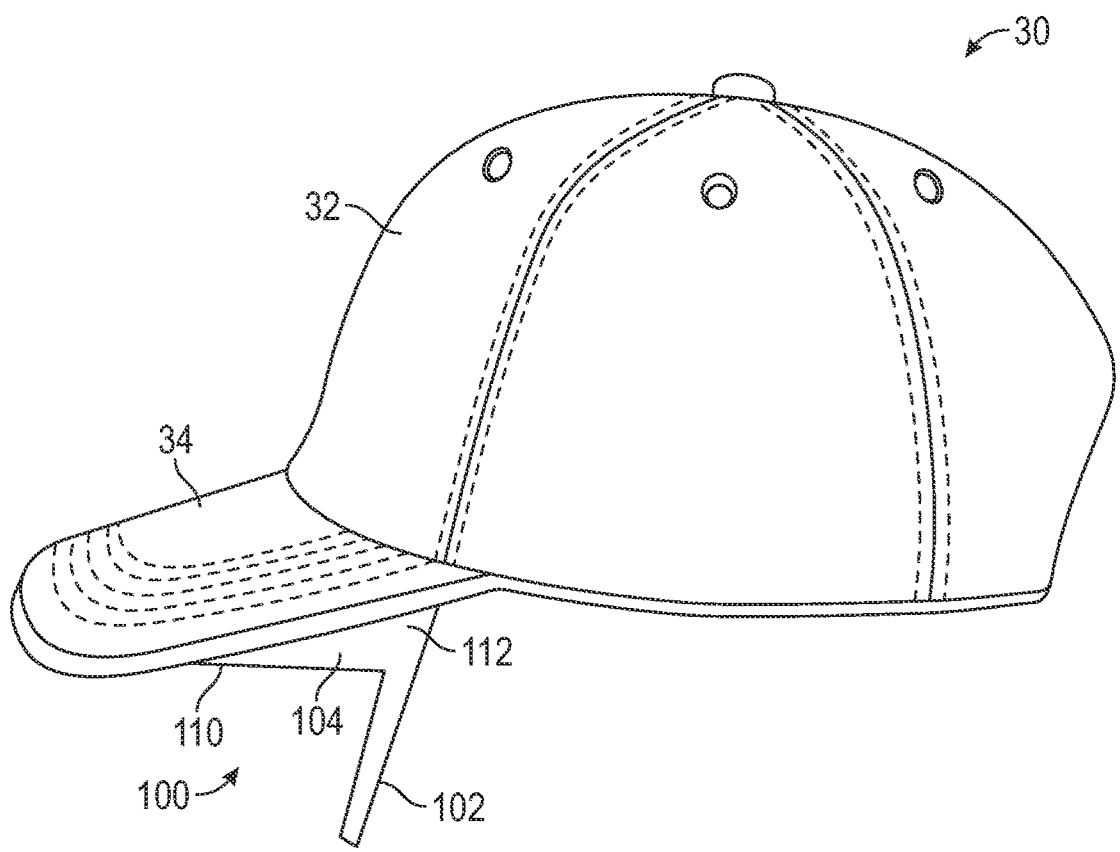
FIG. 2C is a side view of the field of vision divider of FIG. 2A attached to a bill cap.
Figure 2D:
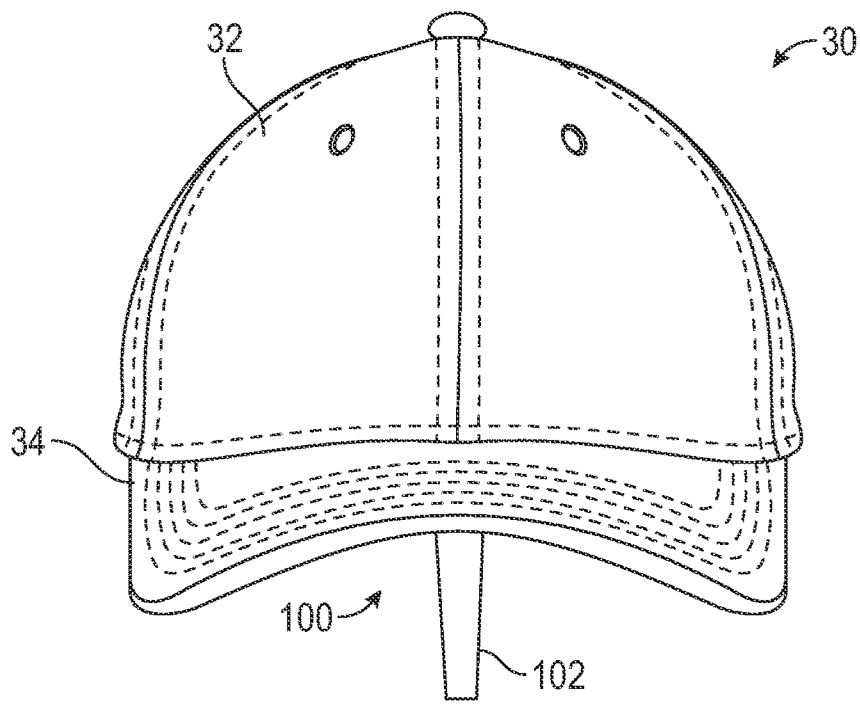
FIG. 2D is a front view of the field of vision divider of FIG. 2A attached to a bill cap.

As shown in FIGS. 2C-2D, the vision divider 100 can be attached to an article of headwear such as the bill cap 30, described herein. The attachment of the vision divider 100 to the bill cap 30 can be identical or substantially identical to the attachment of the vision divider 10 to the bill cap 30, as described herein. Thus, when the bill cap 30 with the attached vision divider 100 is worn, the nose bridge member 102 can hang in front of the face of the wearer, such as over the nose of the wearer.

The vision divider 100 can operate in an identical or substantially identical to the vision divider 10 described herein and illustrated in FIGS. 1A-1B, aside from the differences described herein. Because the separation of the fields of view of the weak eye and the dominant eye is not so great with use of the vision divider 100 as with the vision divider 10, a larger portion of the image of the dominant eye can be used to create the full field of view. This may be particularly advantageous in cases of amblyopia that are more advanced where it is not yet practical to more fully separate the fields of view of the weak eye and the dominant eye.

In specific examples, the thickness T2 of the nose bridge member 102 of the vision divider 100 can be 5 millimeters or less, such as from 0.05 to 5 millimeters.

It will thus be understood that the thickness of the nose bridge member 12, 102 of a vision divider, such as vision dividers 10, 100 can be adjusted based on the degree of obstruction of the fields of view of the left and/or right eyes of the wearer, which in turn may depend on factors such as the severity of the amblyopia to be treated with any training method described herein, the necessary degree of separation to cause the brain to use image data from the weak eye of the wearer, and/or aesthetic considerations.

Figure 3:
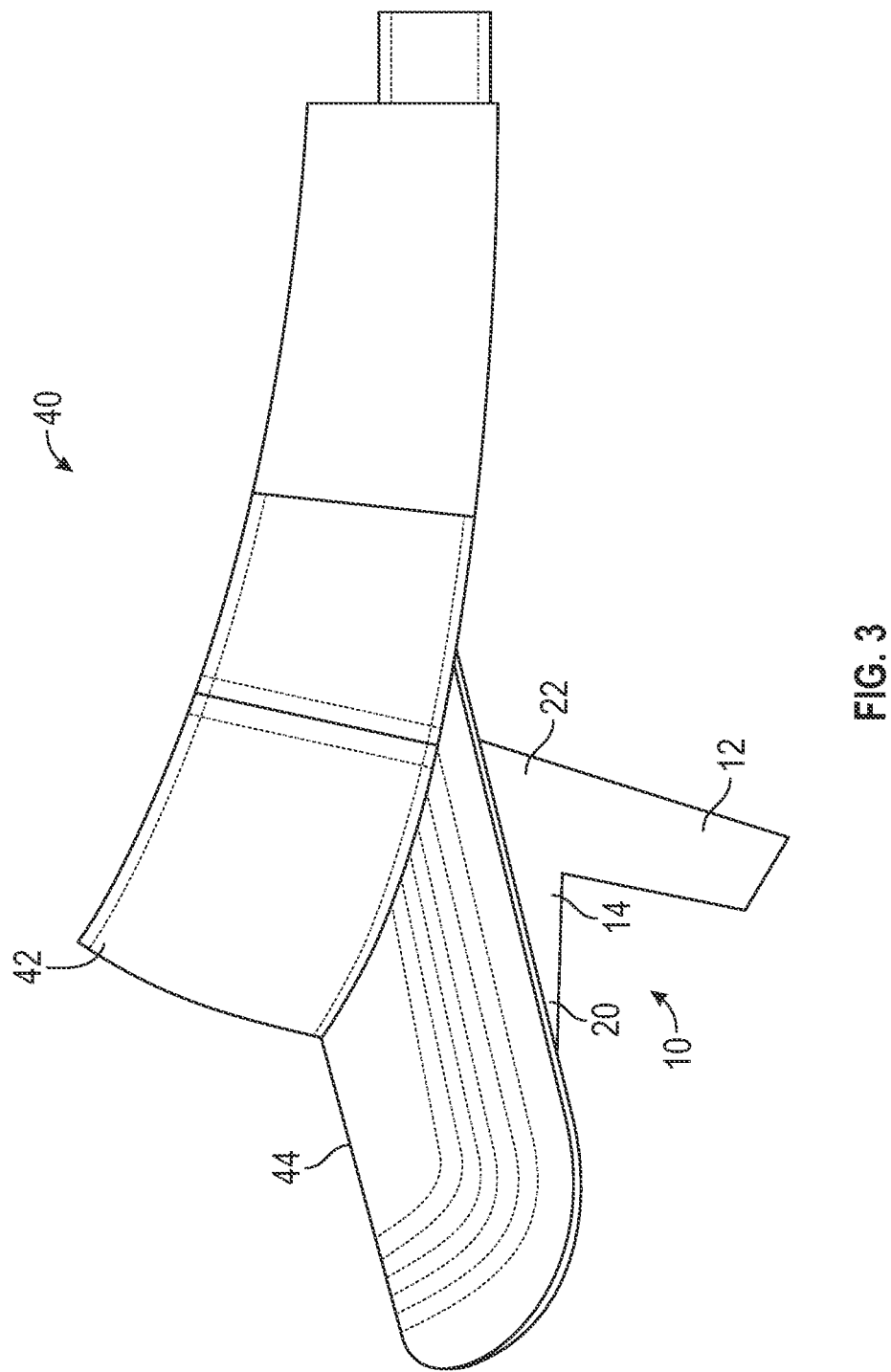
FIG. 3 is a side view of the field of vision divider of FIG. 1A attached to a golf visor.

While FIGS. 1C-1D and FIGS. 2C-2D show the vision dividers 10, 100 attached to the bill cap 30, it is also to be understood that the vision dividers 10, 100 can be attached to other articles of headgear having a bill suitable for attaching the visor attachment member 14, 104. For example, as shown in FIG. 3, the vision divider 10 can be attached to a golf visor 40. The golf visor 40 can comprise a headband portion 42 and a bill portion 44. As shown in FIG. 3, the vision divider 10 can be attached to the bill portion 44 of the golf visor 40 by the visor attachment member 14, such that the nose bridge member 12 will be positioned in front of the face of the wearer when the golf visor 40 is worn, such as over the nose or nose bridge of the wearer. While FIG. 3 shows the golf visor 40 with the vision divider 10 attached, it is to be understood that the vision divider 100 can be attached to the golf visor 40 in the same manner as the vision divider 10.

When the golf visor 40 with the attached vision divider 10, 100 is worn, the vision divider 10, 100 can obstruct or partially obstruct the fields of view of the left and right eyes of the wearer, in substantially the same way as described herein for the bill cap 30 with the vision divider 10 attached. Thus, in substantially similar a fashion as described herein, the golf visor 40 with the attached vision divider 10, 100 can train the wearer's brain to use a greater portion of the image from the weak eye to supplement the image from the dominant eye when forming a field of view.

Figure 4A:
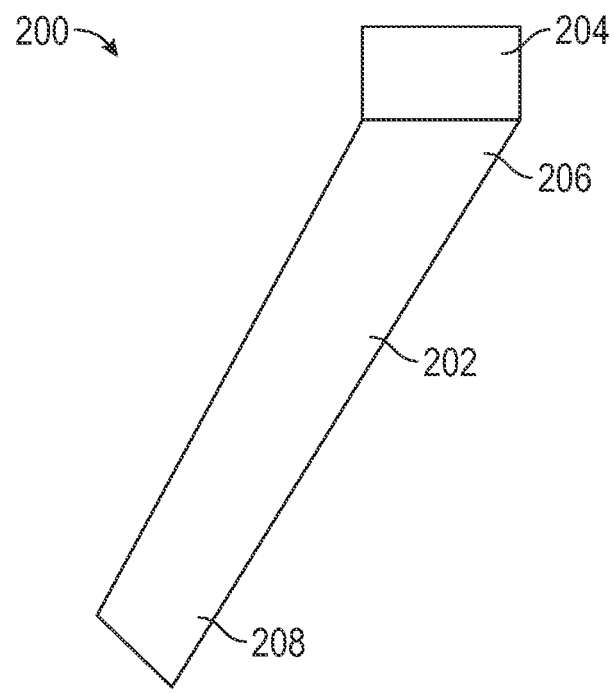
FIG. 4A is a side view of a field of vision divider according to another example.
Figure 4B:
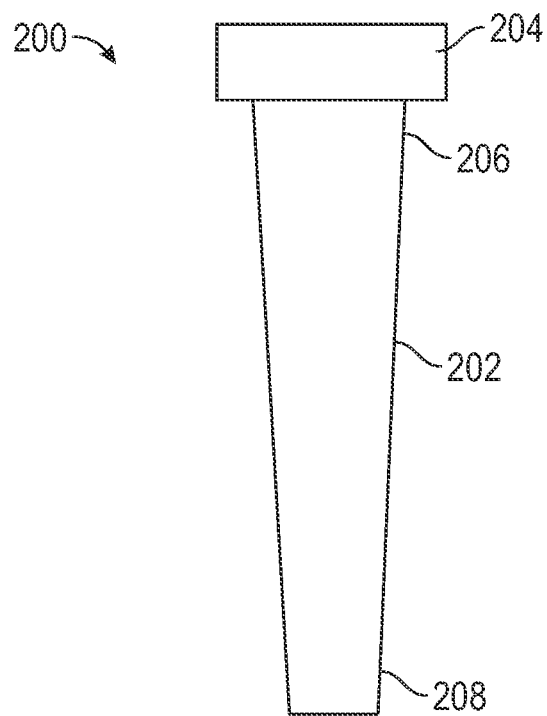
FIG. 4B is a front view of the field of vision divider of FIG. 4A.
Figure 4C:
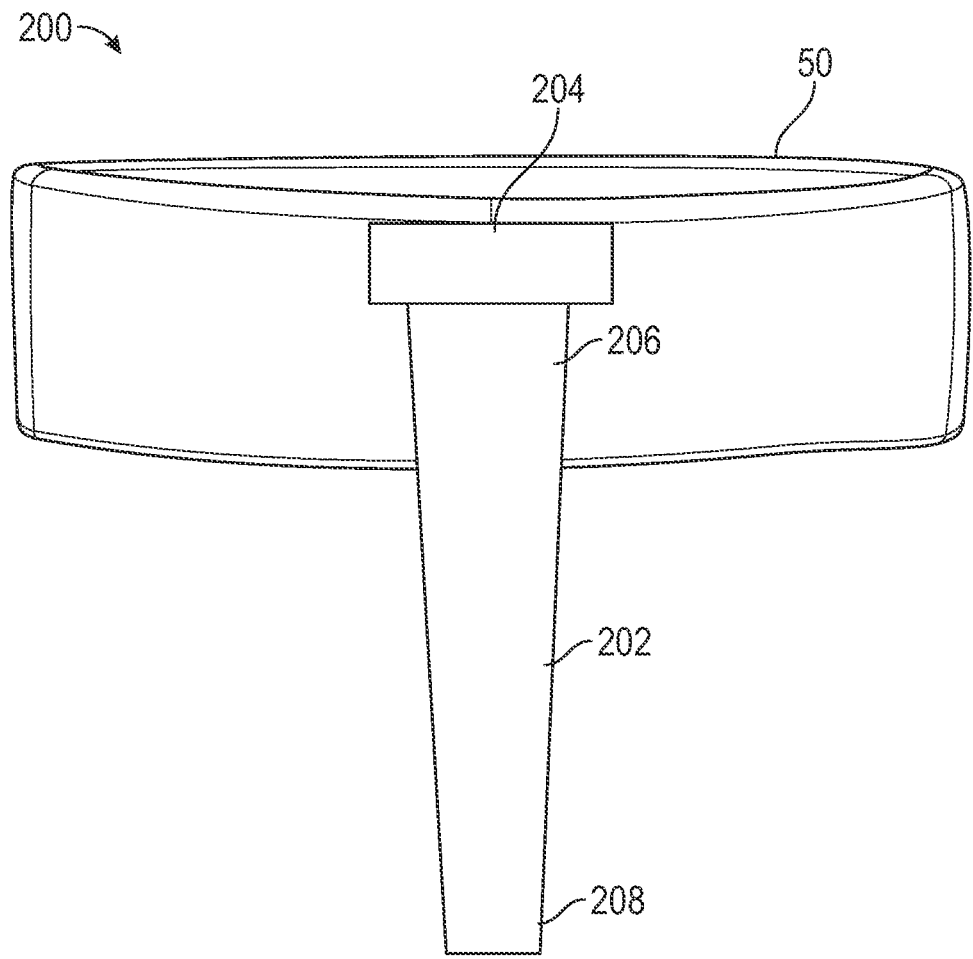
FIG. 4C is a front view of the field of vision divider of FIG. 4A attached to a headband.

In some examples, a vision divider 10, 100 can be attached to a headband or other article of headgear with no bill portion to attach a vision divider 10, 100. FIGS. 4A-4C illustrate a vision divider 200 and a headband 50. The vision divider 200 comprises a nose bridge member 202 and a visor attachment member 204. As shown in FIGS. 4A-4B, the nose bridge member 202 can comprise a first end portion 206 and a second end portion 208.

Because the headband 50 does not include a bill portion, the visor attachment member 204 can omit a front-oriented projection, the visor attachment member 204 can instead be configured to attach directly to the headband 50. Thus, the visor attachment member 204 can be a flat or substantially flat member, which may be attached to the headband 50, as shown in FIG. 4C, by stitches, adhesive, pins, or any other suitable attachment methods.

The nose bridge member 202 is attached to the visor attachment member 204 at the first end portion 206, and extends downwards from the visor attachment member 204, terminating at the second end portion 208, as shown in FIG. 4B. In some examples, the nose bridge member 202 can also be swept forwards, extending forwardly away from the visor attachment member 204 towards the second end portion 208.

In some examples, as shown in FIG. 4B, the nose bridge member 202 can have a taper, such that the nose bridge member 202 is wider at the first end portion 206 and narrower at the second end portion 208, but it is to be understood that in other examples, the width of the nose bridge member 202 can be substantially similar at the first end portion 206 and the second end portion 208, or can be wider at the second end portion 208 than at the first end portion 206. When the headband 50 is worn, the nose bridge member 202 extends in front of the face of the wearer, with the second end portion 208 overlapping or partially overlapping the nose of the wearer.

When the headband 50 with the attached vision divider 200 is worn, the vision divider 200 can obstruct or partially obstruct the fields of view of the left and right eyes of the wearer, in substantially the same way as described above for the bill cap 30 with the vision divider 10 attached. Thus, in substantially similar a fashion to the vision divider 10, the vision divider 200 can train the wearer's brain to use a greater portion of the image from the weak eye to supplement the image from the dominant eye when forming a field of view.

FIGS. 12A-12D show another example device for EBTP that also functions by dividing or partially dividing the left and right fields of view of the wearer. As illustrated in FIGS. 12A-12D, a user's left and right fields of view can be divided by a prosthetic attachment positioned over the nose of the user.

Figure 12A:
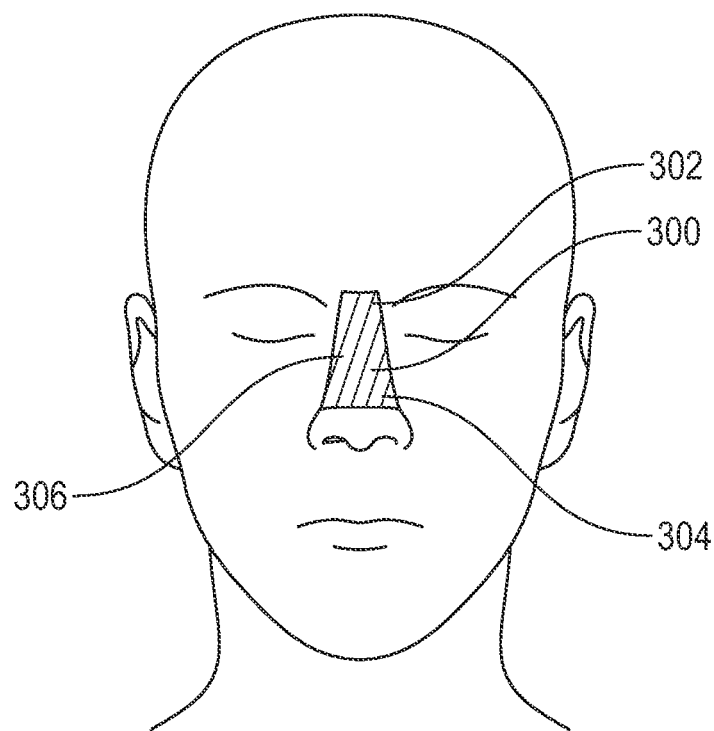
FIG. 12A is a front view of a wearer using a nasal prosthetic according to one example.

FIG. 12A shows a nasal prosthetic 300 in use by a wearer. As shown in FIG. 12A, the nasal prosthetic 300 has an upper end portion 302 extending from the brow of the wearer and a lower end portion 304 disposed towards the tip of the nose. The nasal prosthetic 300 also comprises a medial portion 306 covering the bridge of the nose. In some examples, the nasal prosthetic 300 also comprises left lateral portion 308*a* and a right lateral portion 308*b* extending laterally from the medial portion 306 and covering the sides of the nose.

Figure 12B:
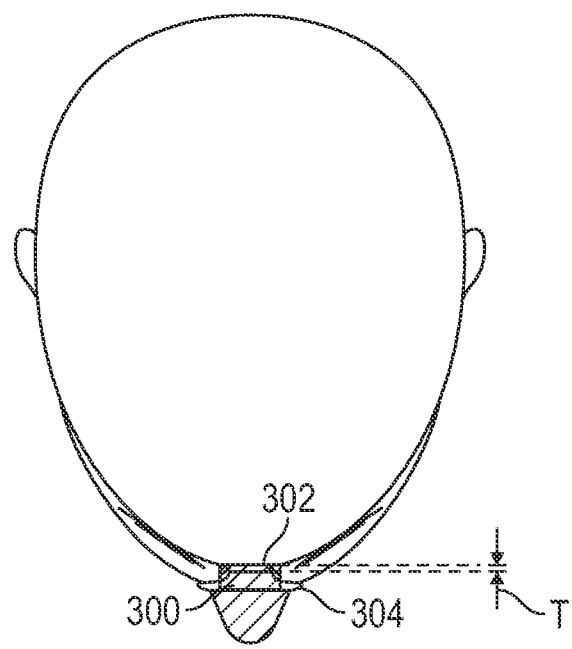
FIG. 12B is a top view of the wearer using the nasal prosthetic of FIG. 12A.
Figure 12C:
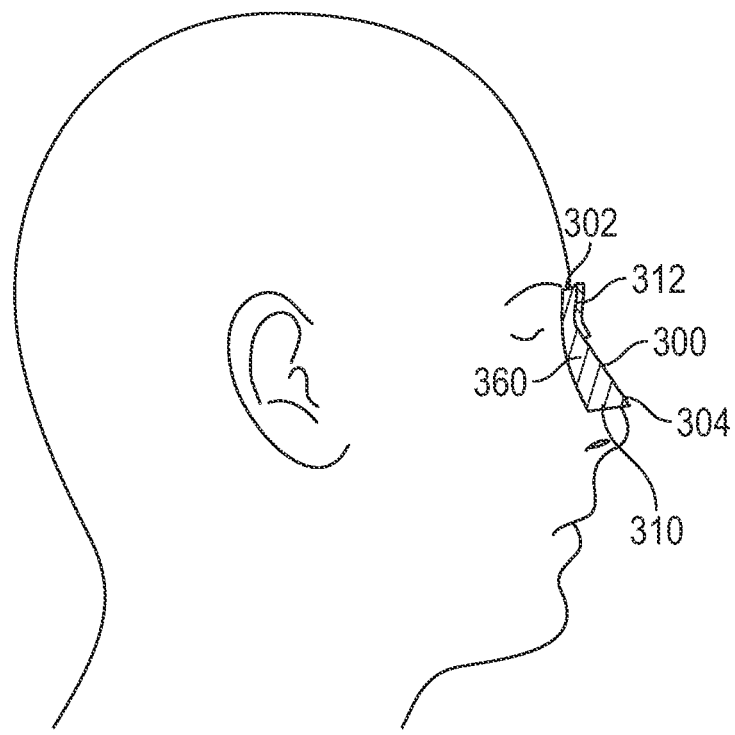
FIG. 12C is a side view of the wearer using the nasal prosthetic of FIG. 12A.
Figure 12D:
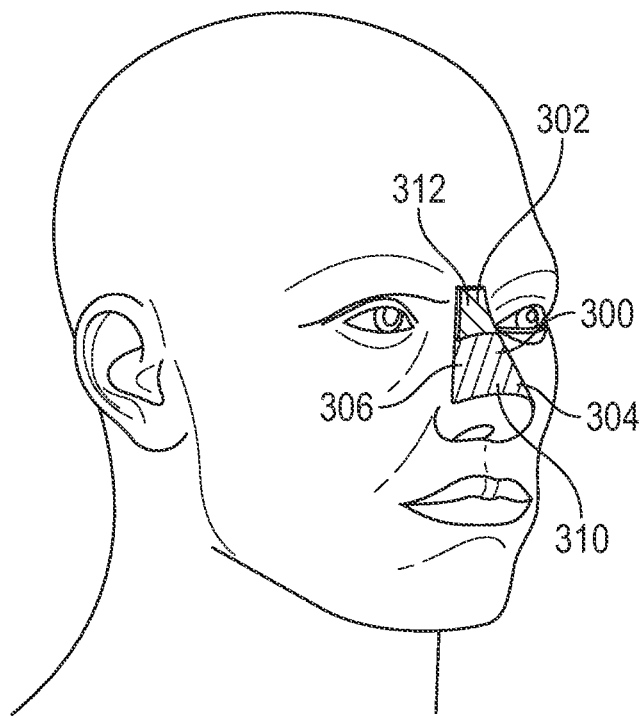
FIG. 12D is a perspective view of the wearer using the nasal prosthetic of FIG. 12A.

The nasal prosthetic 300 can have a thickness T, as indicated in FIGS. 12B and 12D. The thickness T of the nasal prosthetic 300 can be selected based on the degree of obstruction of the field of view of the left eye and/or right eye of the user or wearer. In some examples, the thickness T can be uniform along the length of the nasal prosthetic from the upper end portion 302 to the lower end portion 304. In other examples, it may be advantageous for the nasal prosthetic 300 to be thicker near certain portions of the nose, such as at the bridge of the nose to provide greater obstruction to the field of view of the right eye and/or the left eye, while leaving the overall prosthetic thinner and lighter in other locations. In such examples, the medial portion 306 or part of the medial portion 306 can have a thickness that is greater than that of the rest of the nasal prosthetic 300.

In some examples, the thickness T of the nasal prosthetic 300 can be delivered with a single layer of material of either uniform or varying thickness. In other examples, such as that illustrated in FIGS. 12C and 12D, the thickness of the nasal prosthetic 300 can be provided by multiple layers of material. For example, as illustrated in FIGS. 12C and 12D, the nasal prosthetic 300 can comprise a first material layer 310 and a second material layer 312.

In some examples, the first material layer 310 can cover a greater portion of the nose of the wearer, while the second material layer 312 can cover a lesser portion of the nose of the wearer. For example, as illustrated in FIGS. 12C and 12D, the first material layer 310 can extend from the upper end portion 302 to the bottom end portion 304 of the nasal prosthetic 300, while the second material layer 312 can extend only from the upper end portion 302 to the medial portion 306 of the nasal prosthetic. In this way the nasal prosthetic 300 can be made thicker at the bridge portion of the nose, while leaving the nasal prosthetic 300 thinner towards the tip of the nose.

While FIGS. 12C and 12D show a nasal prosthetic 300 with two material layers 310, 312, it is to be understood that, if needed, additional material layers can be added to provide additional thickness, such that the nasal prosthetic 300 can comprise more than two material layers, such as three, four, five, or six material layers. It is also to be understood that the material layers may be sized and positioned differently, to provide for varying or uniform thickness in various portions of the nasal prosthetic, as necessary to account for factors such as the shape of the user's or wearer's nose, the degree of obstruction desired between the field of view of the left eye and the right eye, aesthetic or other considerations, or any combination thereof.

In some examples, the nasal prosthetic 300 can comprise elastomeric materials, such as rubber, foam rubber, silicone rubber, neoprene rubber, polyurethane, or a combination thereof. It is to be understood that any material moldable to conform to the shape of the wearer's nose may be suitable for forming the nasal prosthetic 300.

In some examples, the nasal prosthetic 300 shown in FIGS. 12A-12D can be attached to the wearer's nose by an adhesive material or adhesive layer attached to the rear side (that is, the side of the nasal prosthetic 300 oriented towards the wearer's face when worn) of the nasal prosthetic 300.

The nasal prosthetic 300 illustrated in FIGS. 12A-12D thus artificially "extends" the bridge of the wearer's nose. This provides an obstruction between the left and right fields of vision, and thus further separates the images in the weak eye and the dominant eye and requires the brain to use a greater portion of the image from the weak eye in forming the full field of view.

Also disclosed herein are devices for EBTP that selectively obscure or limit the image of the dominant eye of the wearer. Such devices can train the brain for improved usage of visual information from the weak eye of the wearer by limiting the amount of the full field of view that can be supplied by the wearer's dominant eye. By forcing the brain to increasingly rely on visual information from the weak eye, the brain can be trained to better process visual information from the weak eye and integrate it with visual information from the dominant eye.

Figure 5A:
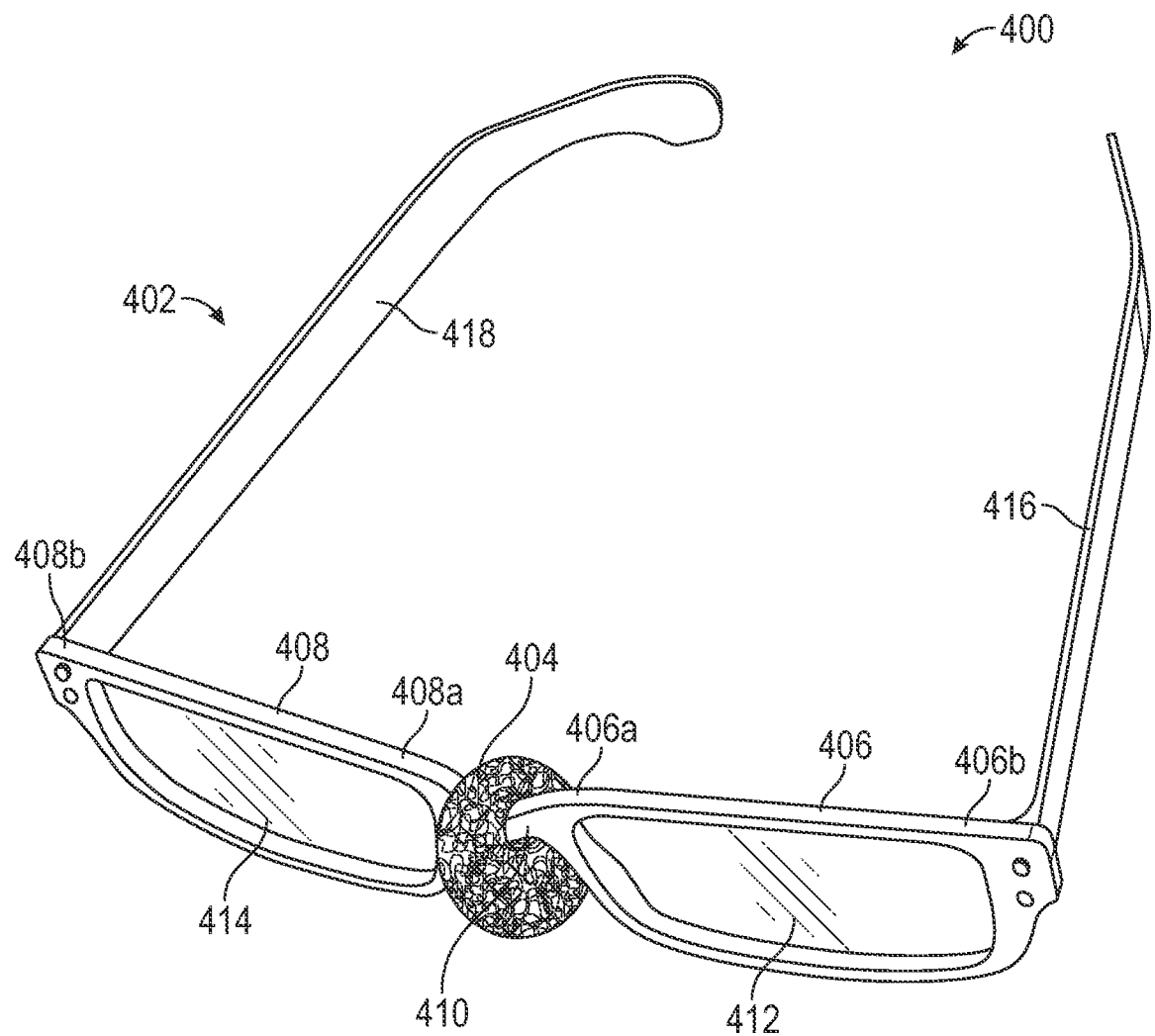
FIG. 5A is a perspective view of an eye-brain training process device according to one example having a sleeve in a retracted configuration.
Figure 5B:
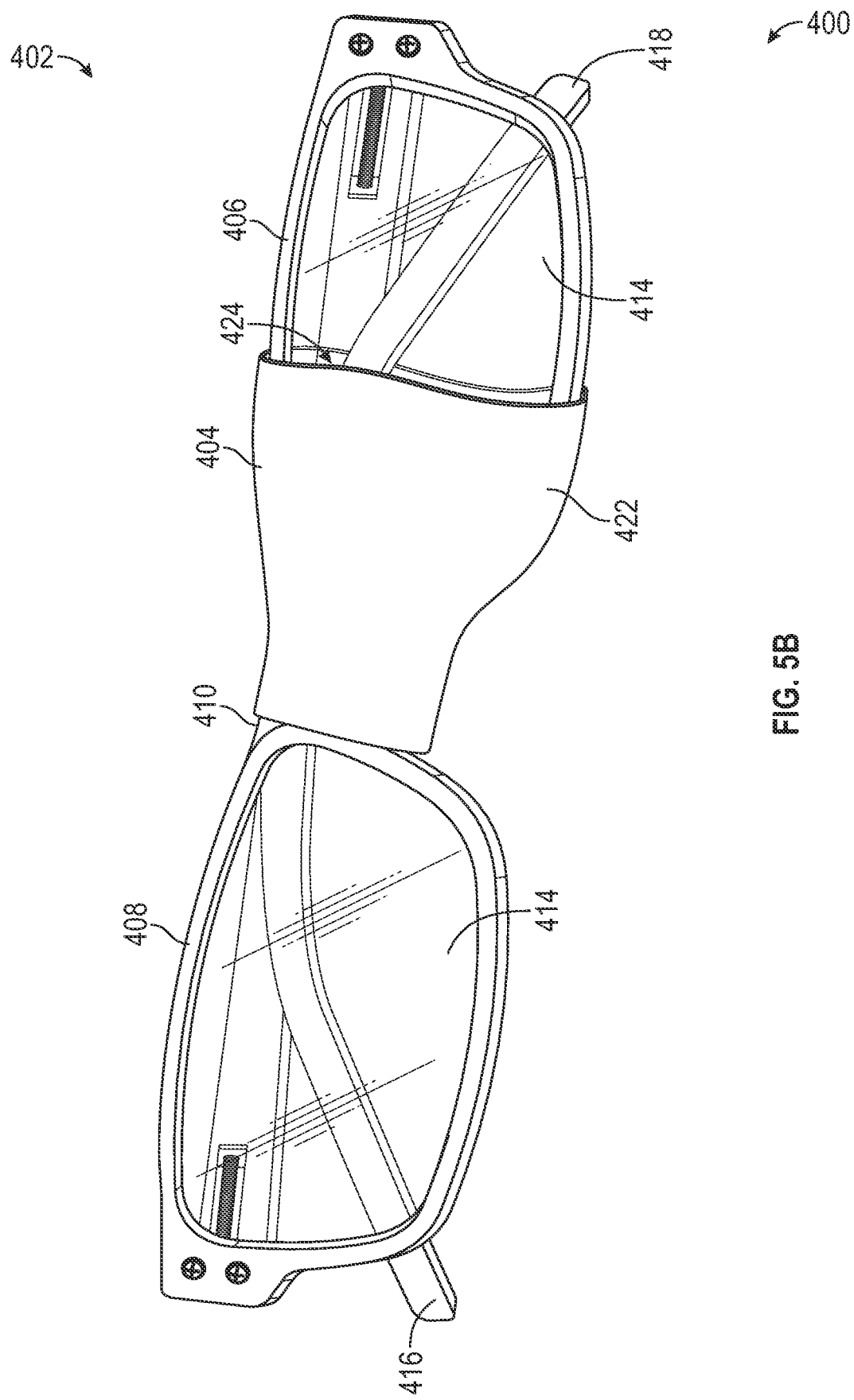
FIG. 5B is a perspective view of the eye-brain training process device of FIG. 5A with the sleeve in the deployed configuration.

FIGS. 5A and 5B show an EBTP device 400 according to one example. EBTP device 400 comprises an article of eyewear 402 and an elastic sleeve 404. The EBTP device 400 can train the wearer's brain and eyes by partially obstructing the field of view of the dominant eye by partially covering the field of view out of the article of eyewear 402.

In some examples, such as that illustrated in FIGS. 5A and 5B, the article of eyewear 402 can be an article of eyewear 402. The article of eyewear 402 can comprise a first lens rim 406 and a second lens rim 408. The lens rims 406, 408 can be connected by a bridge member 410 extending between a medial end portion 406a of the first lens rim 406 and a medial end portion 408a of the second lens rim 408.

In some examples, a first lens 412 can be positioned in the first lens rim 406 and a second lens 414 can be positioned in the second lens rim 408. In some examples, at least one of the first lens 412 and the second lens 414 can be corrective lenses. However, it is to be understood that in other examples, the lenses may be cosmetic (that is, non-corrective).

The article of eyewear 402 can also comprise a first arm 416 and a second arm 418. The first arm 416 can extend from a lateral end portion 406b of the first lens rim 406, and the second arm 418 can extend from a lateral end portion 408b of the second lens rim 408. In some examples, the first arm 416 and the second arm 418 can be connected to the first lens rim 406 and the second lens rim 408 by a hinge member 420, which allows the arms 416, 418 to be movable between an open configuration in which they extend perpendicular or substantially perpendicular to the lens rims 406, 408 (as shown in FIG. 5A) and a closed configuration, in which they extend parallel or substantially parallel to the lens rims 406, 408 (as shown in FIG. 5B).

The elastic sleeve 404 can be disposed around one or more portions of the article of eyewear 402 and comprises a sleeve portion 422 and a lumen 424 extending through the sleeve portion 422. The elastic sleeve 404 can be moved between a collapsed configuration and an extended configuration. For example, as shown in FIG. 5A, when the elastic sleeve 404 is in the collapsed configuration, it can be pulled away from the lens rims 406, 408 and the lenses 412, 414. In the collapsed configuration, the elastic sleeve can thus be disposed entirely around a portion of the article of eyewear 402, such as the bridge member 410.

The elastic sleeve 404 can be moved from the collapsed configuration to the extended configuration by unrolling the sleeve portion 422 over the either the first lens rim 406 or the second lens rim 408, as shown in FIG. 5B. Thus, a portion of the lens rims 406, 408 (for example, the medial end portion 406a, 408a) and the lens 412, 414 affixed therein extends into the lumen 424 of the elastic sleeve 404. The sleeve portion 422 of the elastic sleeve therefore partially covers the lens 412, 414. The elastic sleeve 404 can be returned from the extended configuration to the collapsed configuration by rolling the sleeve portion off of the lens rims 406, 408, returning the elastic sleeve 404 to the bridge member 410. While FIG. 5B shows the elastic sleeve 404 extended over the first lens rim 406 and the first lens 412, it is to be understood that the elastic sleeve 404 can also be extended over the second lens rim 408 and the second lens 414.

When the EBTP device is worn with the elastic sleeve 404 in the extended configuration, the partial obstruction of the lens 412, 414 by the sleeve portion 422 also partially obstructs the view of the wearer's eye looking through the lens 412, 414. When the view of the wearer's dominant eye is obstructed in this way, the wearer's brain is forced to operate with a limited or partial image from the dominant eye and is therefore forced to increasingly rely on the weak eye. This increased reliance on image information from the weak eye to form a complete field of view forces the brain to use and blend image information from the weak eye with image information to the dominant eye, thus training both the brain and the weak eye to work in closer coordination for providing the wearer a complete field of view.

Because the degree of obstruction of the lens 412, 414 can be controlled by extending the elastic sleeve 404 over the lens 412, 414 to a greater or lesser degree, the field of view through the partially occluded lens 412, 414 can also be adjusted based on the degree of the wearer's amblyopia, and the degree to which it is desirable to force the wearer's brain to rely on image information from the weak eye to supplement image information from the dominant eye. Thus, the EBTP device 400 can be useful for training users suffering from varying degrees of amblyopia and may be easily adjusted by the wearer.

Figure 6:
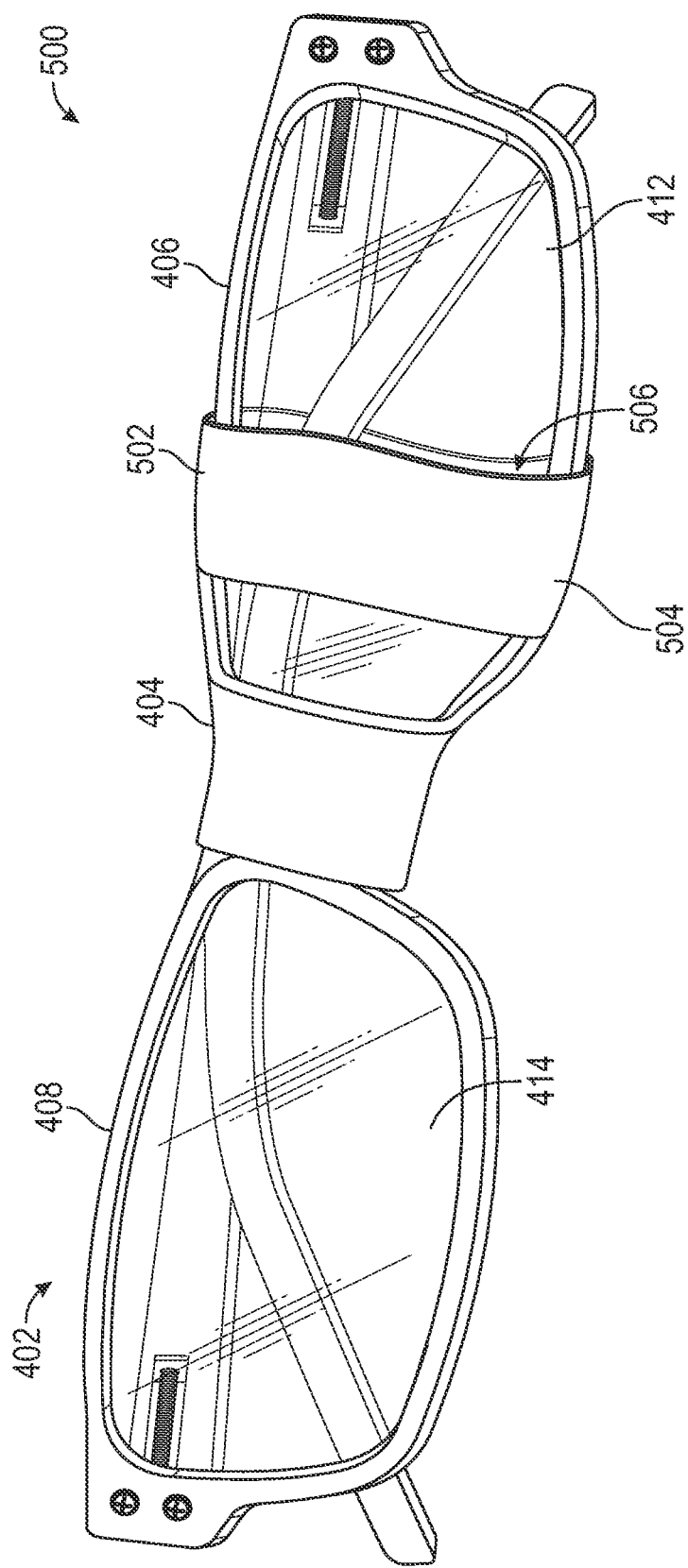
FIG. 6 is a perspective view of an eye brain training process device according to another example having a first sleeve and a second sleeve.

FIG. 6 shows an EBTP device 500 according to another example. The EBTP device 500 comprises an article of eyewear 402, a first elastic sleeve 404, and a second elastic sleeve 502. The EBTP device 500 is similar to the EBTP device 400 described herein, and functions in an identical or substantially identical manner, except as further described herein.

The second elastic sleeve 502 comprises a sleeve portion 504 and a lumen 506 extending through the sleeve portion 504. The second elastic sleeve 502 can be disposed around a portion of a lens rim 406, 408, with the lens rim 406, 408 extending through the lumen 506 of the second elastic sleeve 502.

The second elastic sleeve 502 can be disposed around the first lens rim 406 or the second lens rim 408, spaced laterally apart from the first elastic sleeve 404 to define a gap between the second elastic sleeve 502 and the first elastic sleeve 404. Thus, the first elastic sleeve 404 and the second elastic sleeve 502 define a gap 508 through which the first lens 412 or the second lens 414 is exposed. In this way, a specific portion of the field of view of the dominant eye can be blocked or permitted by varying the positioning of the first elastic sleeve 404 and the second elastic sleeve 502 relative to each other and to the lens rim 406, 408. Advantageously, this allows a wearer to easily adjust the EBTP device 500 to provide specific portions of the field of view of the dominant eye to the brain for the composition of the full field of view.

It is to be understood that while FIGS. 5A through 6 show an EBTP device 400, 500 comprising an article of eyewear 402 having a first lens rim 406 and a second lens rim 408, in some examples, the second lens rim (and the second lens) can be omitted.

The elastic sleeves 404, 502 described herein may be comprised of any suitably elastic material capable of stretching to form to the shape of the various components of the article of eyewear 402. In specific examples, the elastic sleeves 404, 502 can be formed of a gel-like material or soft rubber, such as silicone gel, an elastic fabric such as polyester, nylon, or Lycra™, or any combination these materials.

Figure 7A:
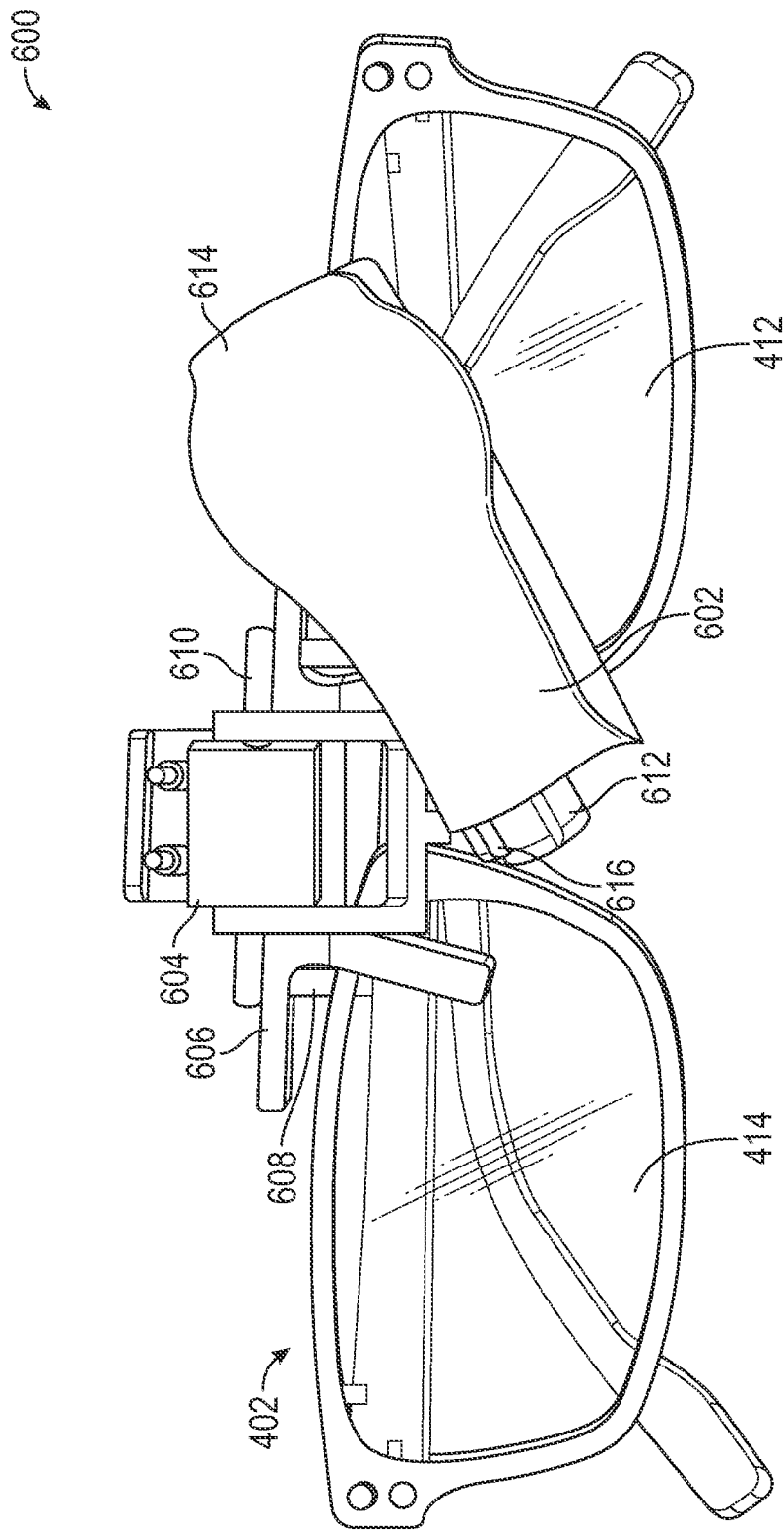
FIG. 7A is a front view of an eye-brain training process device according to another example having a vision obstruction member in a deployed position.

FIGS. 7A and 7B show an EBTP device 600 according to one example. EBTP device 600 comprises an article of eyewear 402 and an obstruction member 602. The article of eyewear 402 can have the features and characteristics previously described in relation to the EBTP devices 400 and 500 described above.

The obstruction member 602 can be attached to the article of eyewear 402 by a mounting bracket 604. The mounting bracket 604 can comprise a front gripping portion 606 and a rear gripping portion 608. The front gripping portion 606 and the rear gripping portion 608 can be connected by a hinge 610 (sometimes called a joint 610), allowing the front and rear gripping portions 606, 608 to move rotatably relative to one another, so as to receive the article of eyewear 402 between them. The front gripping portion 606 and the rear gripping portion 608 can clamp onto a front portion and a rear portion of the article of eyewear 402 to secure the mounting bracket 604 to the article of eyewear 402. In some examples, the hinge 610 can include a spring member to urge the front and rear gripping portions 606, 608 together to secure them against the article of eyewear 402.

As shown in FIG. 7A, the obstruction member 602 can comprise a first end portion 612 and a second end portion 614. As illustrated, the obstruction member 602 can connect to the mounting bracket 604 at the first end portion 612. In some examples, the first end portion 612 of the obstruction member 602 can be connected to the mounting bracket 604 by a rotating joint 616 (such as a ball joint or other suitable rotatable joint), allowing the obstruction member 602 to be rotatably moved relative to the mounting bracket 604.

This allows the obstruction member 602 to be positioned in front of a portion of one of the lenses 412, 414 to partially obstruct the field of view of the wearer. That is, the obstruction member 602 can be moved between an undeployed position in which the obstruction member 602 is disposed in line with and/or over the wearer's nose (shown in FIG. 7B) and a deployed position in which the obstruction member 602 is deployed to partially obstruct the field of view of one of a wearer's eyes (shown in FIG. 7A). Because the obstruction member 602 is attached to the mounting bracket 604 by the rotating joint 616, it can be positioned over either the left lens or the right lens of the article of eyewear 402, depending on which eye is the wearer's dominant eye. Additionally, the rotating joint 616 allows the degree to which the obstruction member 602 obstructs the field of view of the wearer to be easily adjusted by the wearer when the EBTP device is worn, as discussed below.

In some examples, such as the one illustrated in FIGS. 7A and 7B, the second end portion 614 can have a circular or oval shape. In other examples, the second end portion 614 can have other geometries, such as rectangular, triangular, or tapered, depending on the portions of the field of view out of the lenses 412, 414 that is to be obstructed. In some examples, such as that illustrated in FIGS. 7A and 7B, the obstruction member 602 can be rigid or substantially rigid, however it is to be understood that in other examples, the obstruction member 602 can comprise flexible or soft material.

When the EBTP device is worn with the obstruction member 602 in the extended configuration, the partial obstruction of the lens 412, 414 by the obstruction member 602 also partially obstructs the view of the wearer's eye looking through the lens 412, 414. When the view of the wearer's dominant eye is obstructed in this way, the wearer's brain is forced to operate with a limited or partial image from the dominant eye and is therefore forced to increasingly rely on the weak eye. This increased reliance on image information from the weak eye to form a complete field of view forces the brain to use and blend image information from the weak eye with image information to the dominant eye, thus training both the brain and the weak eye to work in closer coordination for providing the wearer a complete field of view.

Because the degree of obstruction of the lens 412, 414 can be controlled by positioning the obstruction member 602 around the rotating joint 616 over the lens 412, 414 to a greater or lesser degree, the field of view through the partially occluded lens 412, 414 can also be adjusted based on the degree of the wearer's amblyopia, and the degree to which it is desirable to force the wearer's brain to rely on image information from the weak eye to supplement image information from the dominant eye. Thus, the EBTP device 600 can be useful for training users suffering from varying degrees of amblyopia and may be easily adjusted by the wearer.

Figure 8A:
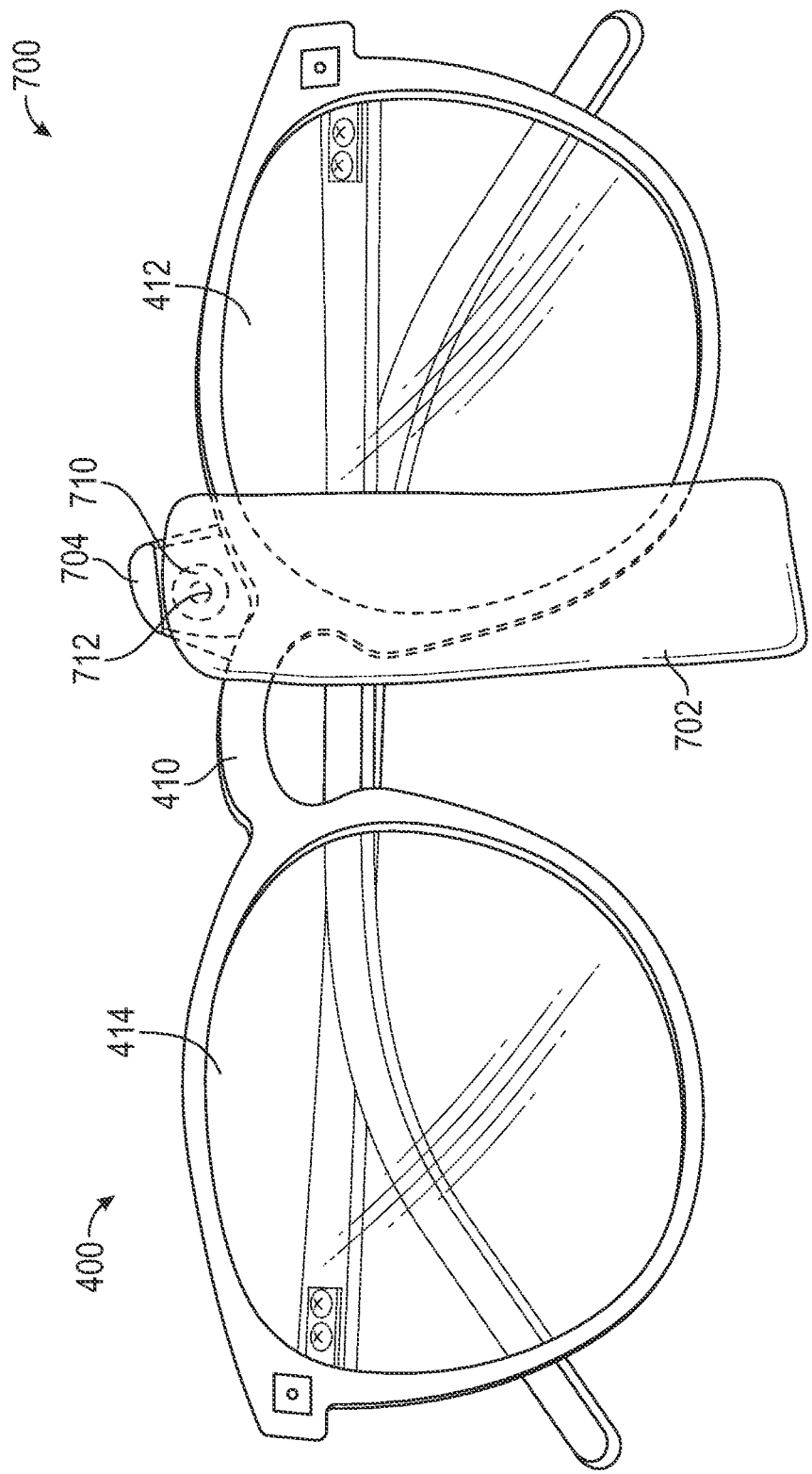
FIG. 8A is a front view of an eye-brain training process device according to another example.
Figure 8B:
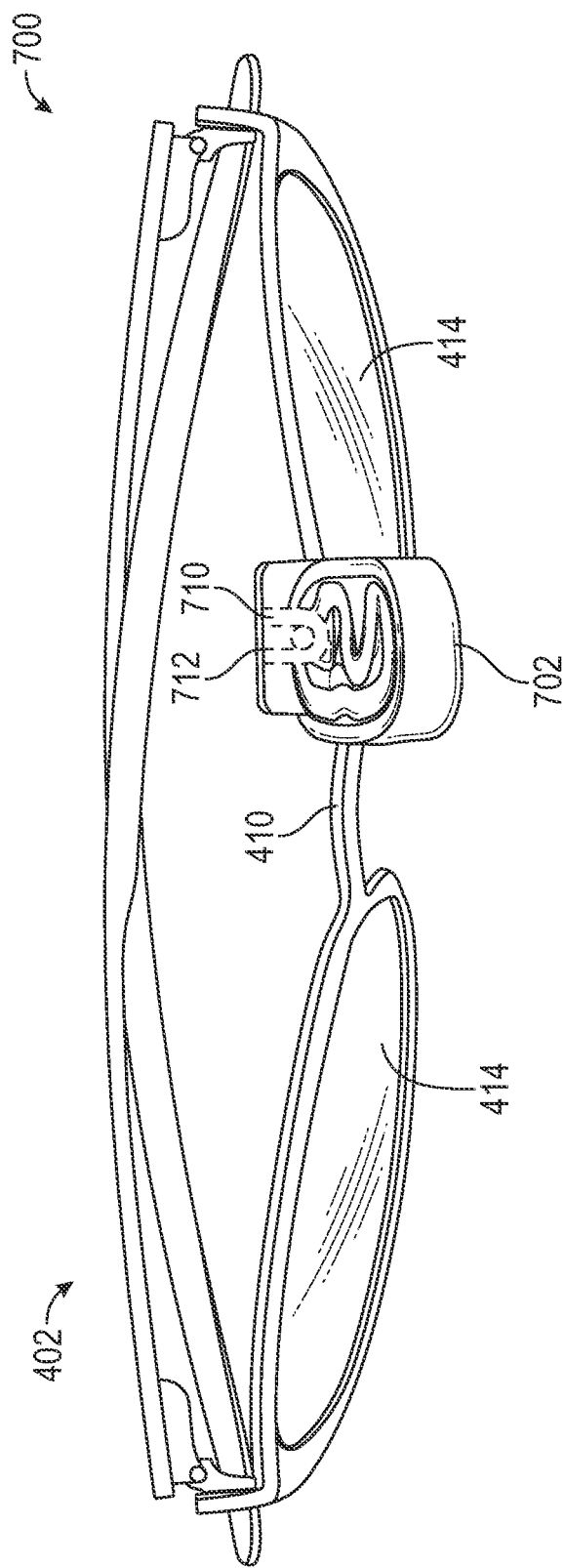
FIG. 8B is a top view of the eye-brain training process device of FIG. 8A.
Figure 8C:
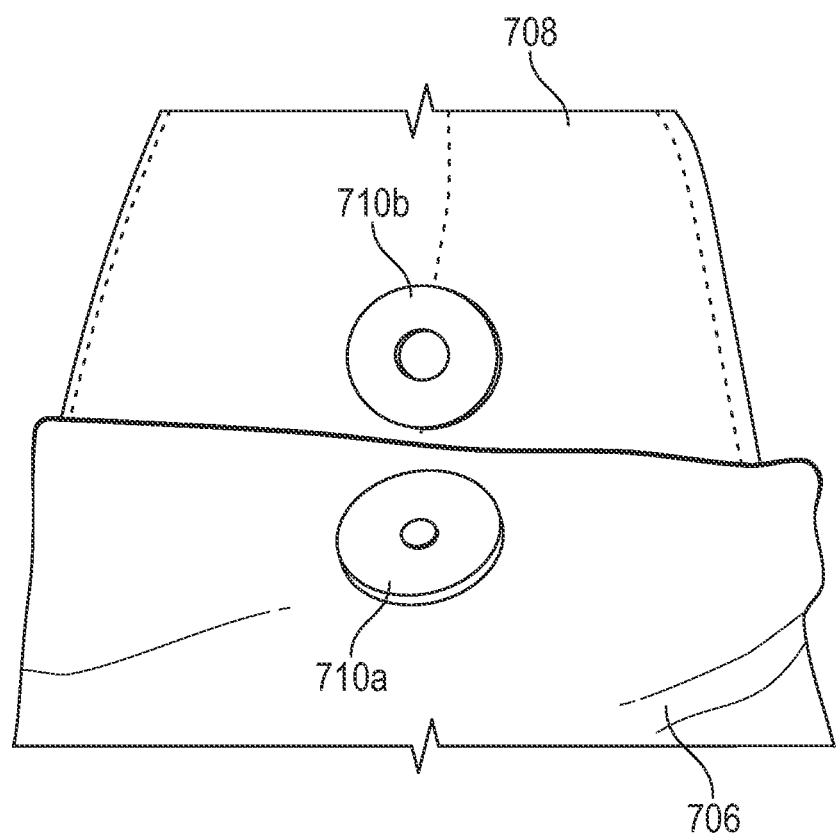
FIG. 8C is a perspective view of the attachment member of the eye-brain training process device of FIG. 8A.

FIGS. 8A-8C show an EBTP device 700 according to another example. The EBTP device 700 comprises an article of eyewear 402 and an obstruction member 702. The EBTP device 700 is similar to the EBTP device 600 described herein, and functions in an identical or substantially identical manner, except as further described herein.

The obstruction member 702 can be attached to the article of eyewear 402 by a mounting element 704. The mounting element 704 can comprise a first flap portion 706 and a second flap portion 708 that can be foldably moved relative to one another, as best shown in FIG. 8C. In some examples, the first flap portion 706 and the second flap portion 708 can be releasably secured to one another by a securing mechanism, such as a snap 710.

With continued reference to FIG. 8C, the snap 710 can comprise a male component 710a and a female component 710b. While FIG. 8C shows that the male component 710a is positioned on the first flap portion 706 and the female component 710b is positioned on the second flap portion 708, it is also to be understood that, in other examples, the positions of the male component 710a and the female component 710b can be reversed. That is, the male component 710a can be positioned on the second flap portion 708 and the female component 710b can be positioned on the first flap portion 706.

The mounting element 704 can be attached to the article of eyewear 402 at the bridge member 410, as shown in FIGS. 8A and 8B. In some examples, the first and second flap portions 706, 708 can be positioned on opposite sides of the bridge member 410 (that is, on front and rear sides of the bridge member 410) such that the mounting element 704 enfolds the bridge member 410.

The mounting element 704 can also comprise a rotational pivot 712, which in some examples can be formed or at least partially formed around the snap 710. The obstruction member 702 can be secured to the mounting element 704 at the rotational pivot 712, such that the obstruction member 702 can be rotationally positioned relative to the mounting element 704, and thus one of the lenses 412, 414 of the article of eyewear 402. This allows a wearer to adjust the fraction of the lens 412, 414 obstructed by the obstruction member 702 by rotating the obstruction member 702 clockwise or counterclockwise around the rotational pivot 712, and thus further into or out of the field of view of the wearer.

When the EBTP device 700 is worn, the obstruction member 702 partially obstructs the lens 412, 414 in front of which it is deployed and thus also partially obstructs the view of the wearer's eye looking through the lens 412, 414. When the view of the wearer's dominant eye is obstructed in this way, the wearer's brain is forced to operate with a limited or partial image from the dominant eye and is therefore forced to increasingly rely on the weak eye. This increased reliance on image information from the weak eye to form a complete field of view forces the brain to use and blend image information from the weak eye with image information to the dominant eye, thus training both the brain and the weak eye to work in closer coordination for providing the wearer a complete field of view.

Because the degree of obstruction of the lens 412, 414 can be controlled by rotating the obstruction member 702 around the rotational pivot 712, the field of view through the partially occluded lens 412, 414 can also be adjusted based on the degree of the wearer's amblyopia, and the degree to which it is desirable to force the wearer's brain to rely on image information from the weak eye to supplement image information from the dominant eye. Thus, the EBTP device 700 can be useful for training users suffering from varying degrees of amblyopia and may be easily adjusted by the wearer.

In some examples, the obstruction member 702 can comprise a flexible or moldable material, such as such as rubber, foam rubber, silicone rubber, neoprene rubber, polyurethane, or a combination thereof. This allows for slight adjustments for the shape of the obstruction element, and therefore an improved degree of control over the portions of the field of view of the dominant eye which are obstructed or blocked by the obstruction member 702 when the EBTP device 700 is worn.

Figure 9:
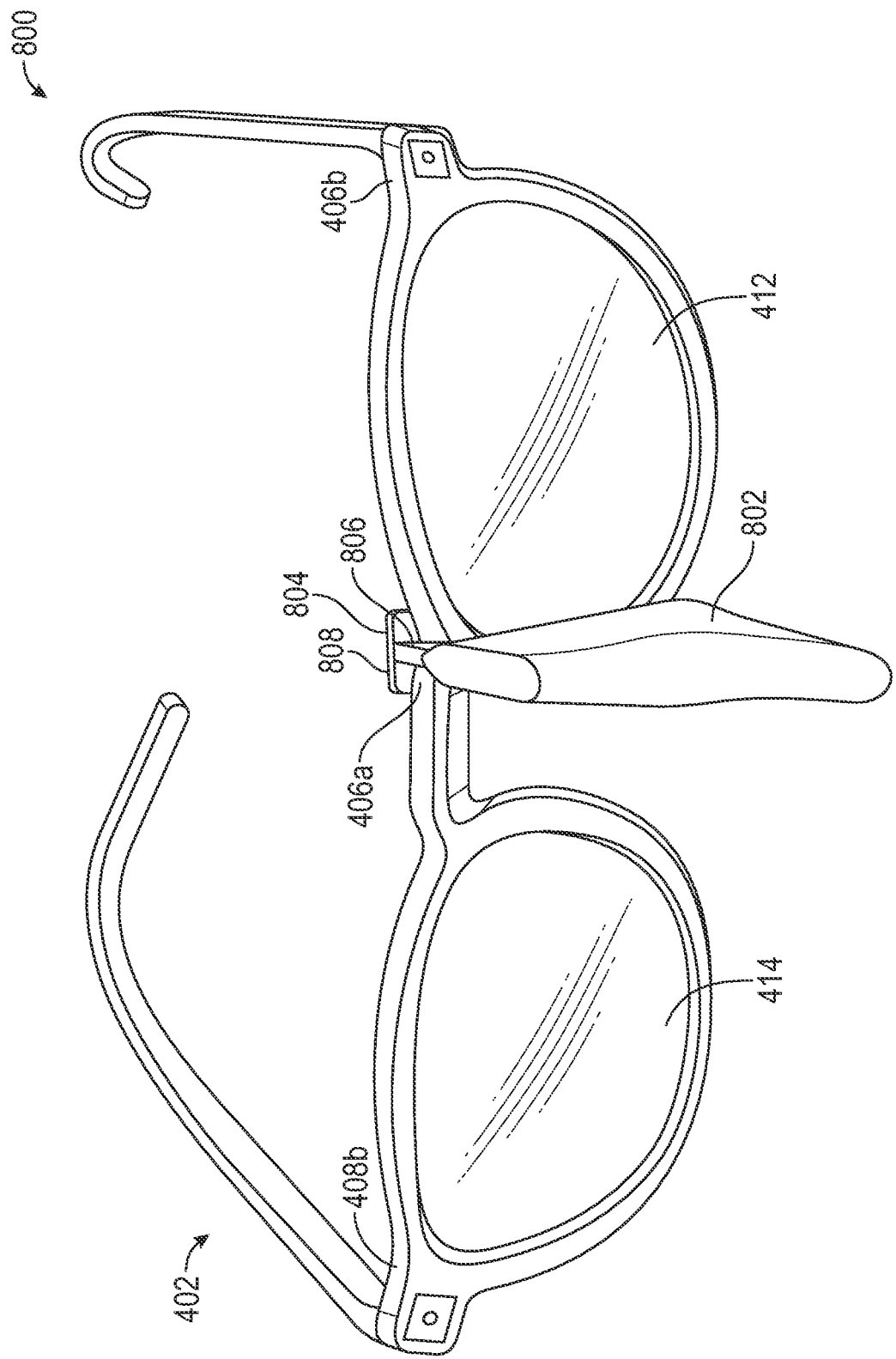
FIG. 9 is a perspective view of an eye-brain training process device according to another example.

FIG. 9 shows an EBTP device 800 according to another example. The EBTP device 800 comprises an article of eyewear 402 and an obstruction member 802. The EBTP device 800 is similar to the EBTP device 700 described herein, and functions in an identical or substantially identical manner, except as further described herein.

In some examples, such as that illustrated in FIG. 9, the obstruction member 802 can be attached to the article of eyewear 402 by a bracket 804. The bracket 804 can comprise a support arm 806 and a clip portion 808. The support arm 806 can extend between the obstruction member 802 and the clip portion 808. As shown in FIG. 9, the clip portion 808 can extend vertically downwards from the support arm 806, forming a notch or slot defined by the obstruction member 802, the support arm 806, and the clip portion 808 that can receive a portion of the article of eyewear 402, such as the first lens rim 406, the second lens rim 408, or the bridge member 410.

The bracket 804 can thus be positioned at any desired point of the front of the article of eyewear 402 between the lateral portions of the first and second lens rims 406b, 408b. For example, as shown in FIG. 9, the bracket 804 and the obstruction member 802 can be positioned at the medial end portion 406a of the first lens rim 406. It is to be understood, however, that the bracket 804 and the obstruction member 802 can be positioned along the length of the article of eyewear 402, depending on a variety of factors, such as which eye is the wearer's dominant eye and the degree to which it is desired to obstruct the field of view of the dominant eye.

In some examples, the support arm 806 or the clip portion 808 can be magnetic, allowing the bracket 804 and the obstruction member 802 to be secured to a metal article of eyewear 402, while preventing accidental lateral movement of the bracket 804 towards either lateral end portion 406b, 408b of the lens rims 406, 408.

In some examples, the clip portion 808 can be a weighted clip portion. In this way, the clip portion 808 can counterbalance the mass of the obstruction member 802 and stabilize the position of the obstruction member 802 relative to the article of eyewear 402.

When the EBTP device 800 is worn, the obstruction member 802 partially obstructs the lens 412, 414 in front of which it is deployed and thus also partially obstructs the view of the wearer's eye looking through the lens 412, 414. Additionally, the obstruction member 802 may partition the field of view between the wearer's right and left eye, thus reducing the ability of the wearer's dominant eye to compensate for the deficiencies of the wearer's weak eye, as previously described herein in relation to, for example, vision divider 10.

When the view of the wearer's dominant eye is obstructed in this way, the wearer's brain is forced to operate with a limited or partial image from the dominant eye and is, therefore, forced to increasingly rely on the weak eye. This increased reliance on image information from the weak eye to form a complete field of view forces the brain to use and blend image information from the weak eye with image information to the dominant eye, thus training both the brain and the weak eye to work in closer coordination for providing the wearer a complete field of view.

Because the degree of obstruction of the lens 412, 414 can be controlled by moving the bracket 804 and the obstruction member 802 further towards or away from either of the lateral end portions 406b, 408b of the lens rims 406, 408, the field of view through the partially occluded lens 412, 414 can also be adjusted based on the degree of the wearer's amblyopia, and the degree to which it is desirable to force the wearer's brain to rely on image information from the weak eye to supplement image information from the dominant eye. Thus, the EBTP device 800 can be useful for training users suffering from varying degrees of amblyopia and may be easily adjusted by the wearer.

The obstruction member 802 can, in some examples, be a rigid or stiff element. That is, the obstruction member 802 can hold or substantially hold its shape without external support. In other examples, the obstruction member 802 can comprise a flexible or pliable material, such as rubber, foam rubber, silicone rubber, neoprene rubber, polyurethane, or a combination thereof.

Figure 10:
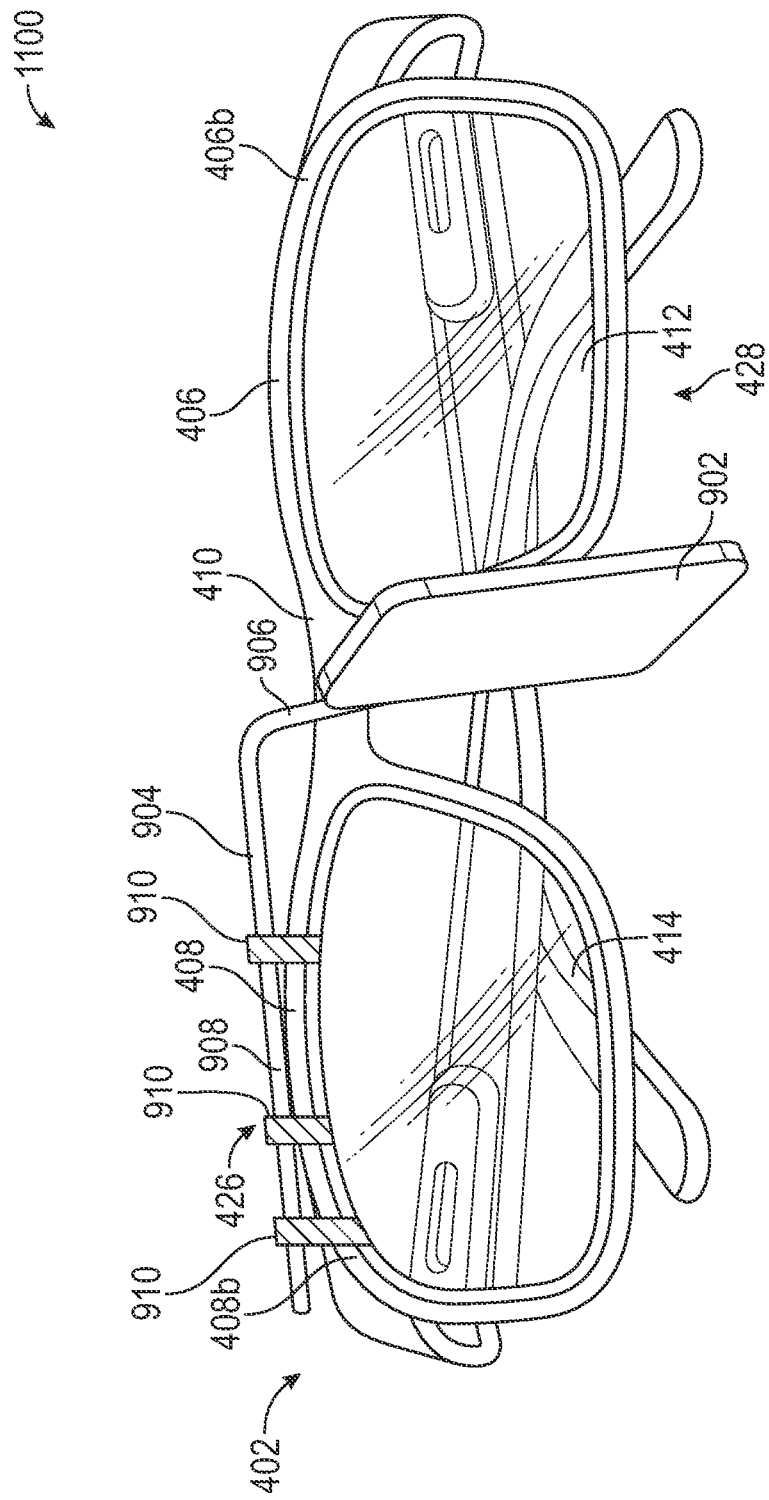
FIG. 10 is a front view of an eye-brain training process device according to another example.

FIG. 10 shows an EBTP device 900 according to another example. The EBTP device 900 comprises an article of eyewear 402 and an obstruction member 902. The EBTP device 900 is similar to the EBTP device 800 described herein, and functions in an identical or substantially identical manner, except as further described herein.

In some examples, such as that illustrated in FIG. 10, the obstruction member 902 can be attached to the article of eyewear 402 by a mounting arm 904. The mounting arm 904 can comprise vertical portion 906 and a lateral portion 908. The lateral portion 908 of the mounting arm 904 can extend along the length of the article of eyewear 402, for example, between the lateral end portion 408b of the second lens rim 408 and the bridge member 410 of the article of eyewear 402 as shown in FIG. 10. The vertical portion 906 can extend from a top edge 426 of the article of eyewear 402 towards a bottom portion 428 of the article of eyewear 402.

The obstruction member 902 can be attached to the vertical portion 906 of the mounting arm 904, such that the obstruction member 902 is positioned to the front side of the article of eyewear 402, such as in front of or alongside one of the lenses 412, 414. This allows the obstruction member 902 to partially obstruct the field of view out of one of the lenses 412, 414, or to partition the field of view between the lenses 412, 414.

The mounting arm 904 can be attached to the article of eyewear 402 by one or more mounting brackets 910. The mounting brackets 910 can be u-shaped or substantially u-shaped clips that extend over the lateral portion 908 of the mounting arm 904, and clip to an edge of the article of eyewear 402, such as the top portion 426 of the article of eyewear 402 as shown in FIG. 10.

The degree of obstruction or the location of the partition of the field of views of the lenses 412, 414 can be controlled by sliding the mounting arm 904 towards or away from either the first lateral end portion 406b or the second lateral end portion 408b of the lens rims 406, 408. This adjusts the position of the obstruction member 902 relative to the lens 412, 414 in front of which it is positioned. Thus, while FIG. 10 shows the lateral portion 908 of the mounting arm 904 positioned above the second lens rim 408 (that is, extending between the lateral end portion 408b of the second lens rim 408 and the bridge member 410) to position the obstruction member 902 in front of the medial end portion 406a of the first lens rim 406, it is to be understood that the mounting arm 904 can be pushed laterally towards the lateral end portion 406b of the first lens rim 406 to move the obstruction member 902 further towards the center of the first lens 412. Similarly, the mounting arm 904 can be pushed laterally towards the lateral end portion 408b of the second lens rim 408 to move the obstruction member 902 further towards the second lens rim 408 and/or the second lens 414.

It is also to be understood that, while FIG. 10 shows an EBTP device 900 having a mounting arm 904 positioned above and secured to the second lens rim 408, the mounting arm 904 can, in other examples, be positioned above and secured to the first lens rim 406, with the obstruction member 902 positioned closer to the second lens rim 408, depending on which eye of the wearer is the dominant eye.

When the EBTP device 900 is worn, the obstruction member 902 partially obstructs the lens 412, 414 in front of which it is deployed and thus also partially obstructs the view of the wearer's eye looking through the lens 412, 414. Additionally, the obstruction member 902 may partition the field of view between the wearer's right and left eye, thus reducing the ability of the wearer's dominant eye to compensate for the deficiencies of the wearer's weak eye, as previously described herein in relation to, for example, vision divider 10.

When the view of the wearer's dominant eye is obstructed in this way, the wearer's brain is forced to operate with a limited or partial image from the dominant eye and is therefore forced to increasingly rely on the weak eye. This increased reliance on image information from the weak eye to form a complete field of view forces the brain to use and blend image information from the weak eye with image information to the dominant eye, thus training both the brain and the weak eye to work in closer coordination for providing the wearer a complete field of view.

Because the degree of obstruction of the lens 412, 414 can be controlled by moving the mounting arm 904 and the obstruction member 902 further towards or away from either of the lateral end portions 406b, 408b of the lens rims 406, 408, the field of view through the partially occluded lens 412, 414 can also be adjusted based on the degree of the wearer's amblyopia, and the degree to which it is desirable to force the wearer's brain to rely on image information from the weak eye to supplement image information from the dominant eye. Thus, the EBTP device 900 can be useful for training users suffering from varying degrees of amblyopia and may be easily adjusted by the wearer.

The obstruction member 902 can, in some examples, be a rigid or stiff element. That is, the obstruction member 902 can hold or substantially hold its shape without external support. In other examples, the obstruction member 902 can comprise a flexible or pliable material, such as rubber, foam rubber, silicone rubber, neoprene rubber, polyurethane, or a combination thereof.

Figure 11:
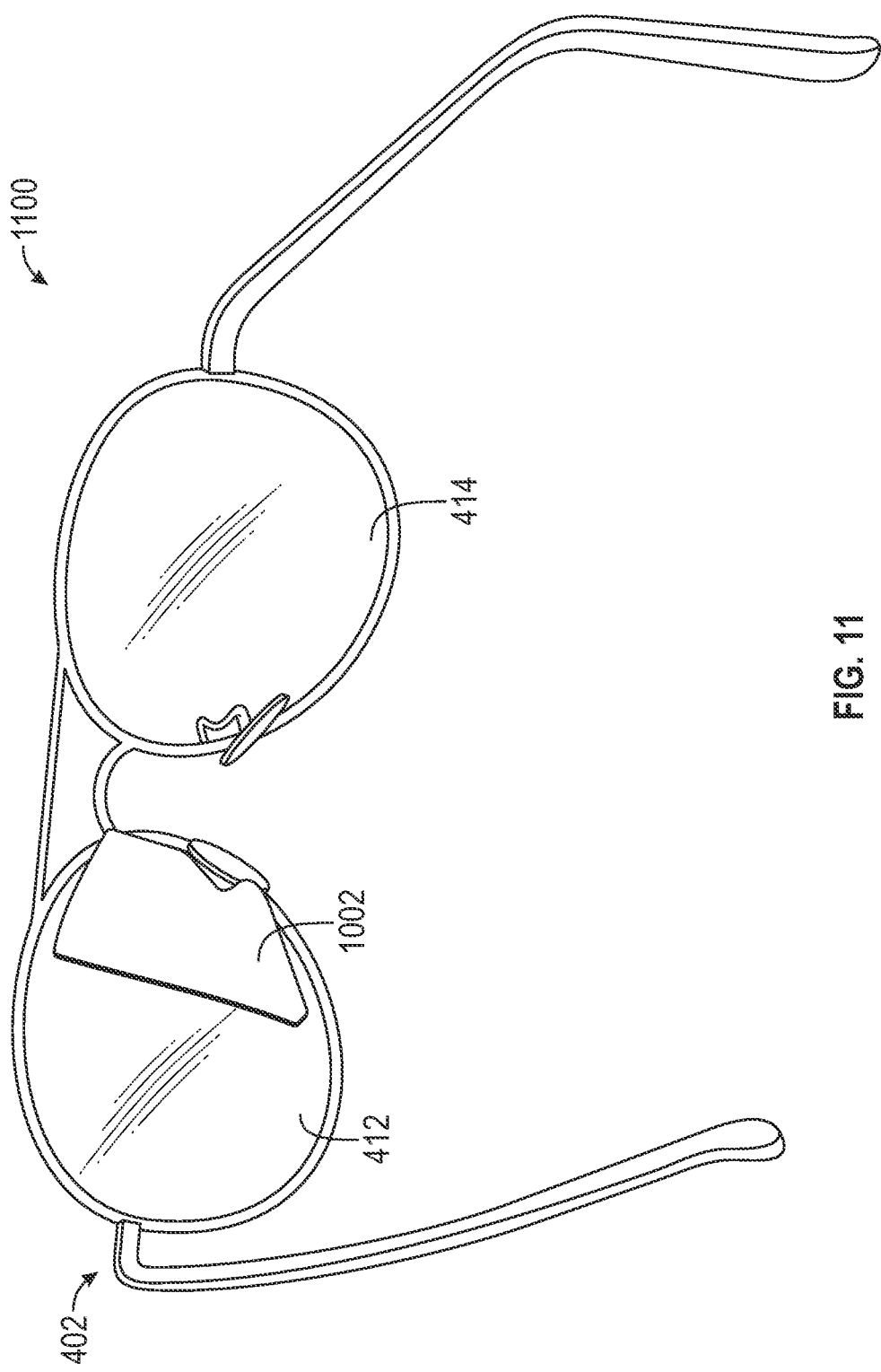
FIG. 11 is a perspective view of an eye-brain training process device according to another example.

FIG. 11 shows an EBTP device 1000 according to another example. The EBTP device 1000 comprises an article of eyewear 402 and an obstruction member 1002. The obstruction member 1002 can be positioned on the rear side of one of the lenses 412, 414 of the article of eyewear 402. The obstruction element can be attached to the rear side of one of the lenses 412, 414 by means of an adhesive layer, and can partially obscure the field of view out of the lens 412, 414 to which it is attached.

When the EBTP device 1000 is worn, the obstruction member 1002 partially obstructs the lens 412, 414 behind which it is deployed and thus also partially obstructs the view of the wearer's eye looking through the lens 412, 414. When the view of the wearer's dominant eye is obstructed in this way, the wearer's brain is forced to operate with a limited or partial image from the dominant eye and is therefore forced to increasingly rely on the weak eye. This increased reliance on image information from the weak eye to form a complete field of view forces the brain to use and blend image information from the weak eye with image information to the dominant eye, thus training both the brain and the weak eye to work in closer coordination for providing the wearer a complete field of view.

In some examples, the lenses 412, 414 can be tinted or colored lenses, for example, the lenses of a pair of sunglasses. In this way, the obstruction member 1002 can be concealed from the view of persons besides the wearer. This may be particularly advantageous if a wearer does not wish to appear to be using an EBTP device.

FIGS. 13A-13D shows an EBTP device 1100 according to another example. The EBTP device 1100 comprises an article of eyewear 402 and an obstruction member 1102. The EBTP device 1100 is similar to the EBTP device 700 described herein, and functions in an identical or substantially identical manner, except as further described herein.

Figure 13A:
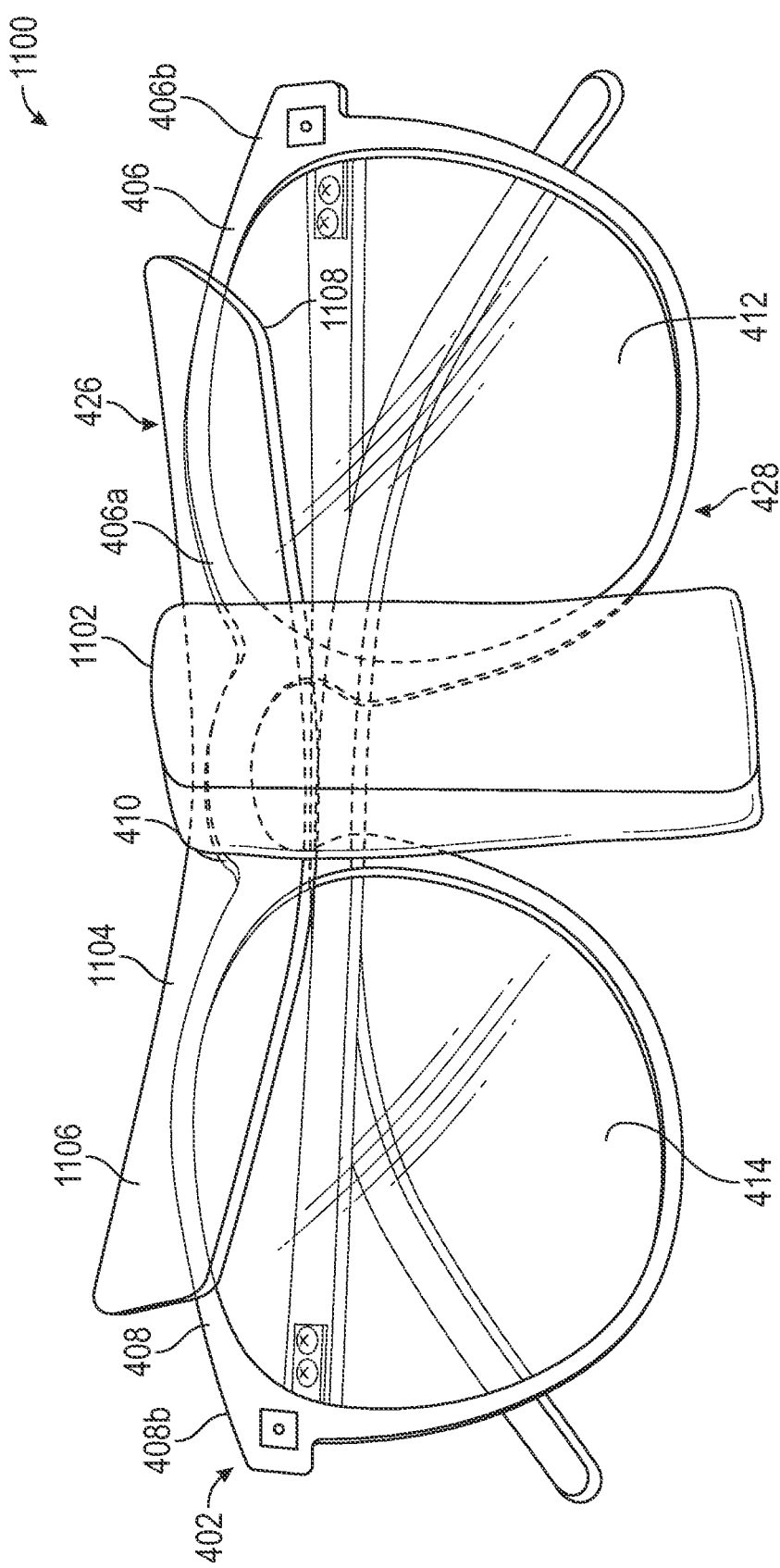
FIG. 13A is a front view of an eye-brain training device according to one example with a vision obstructor in a first position.
Figure 13B:
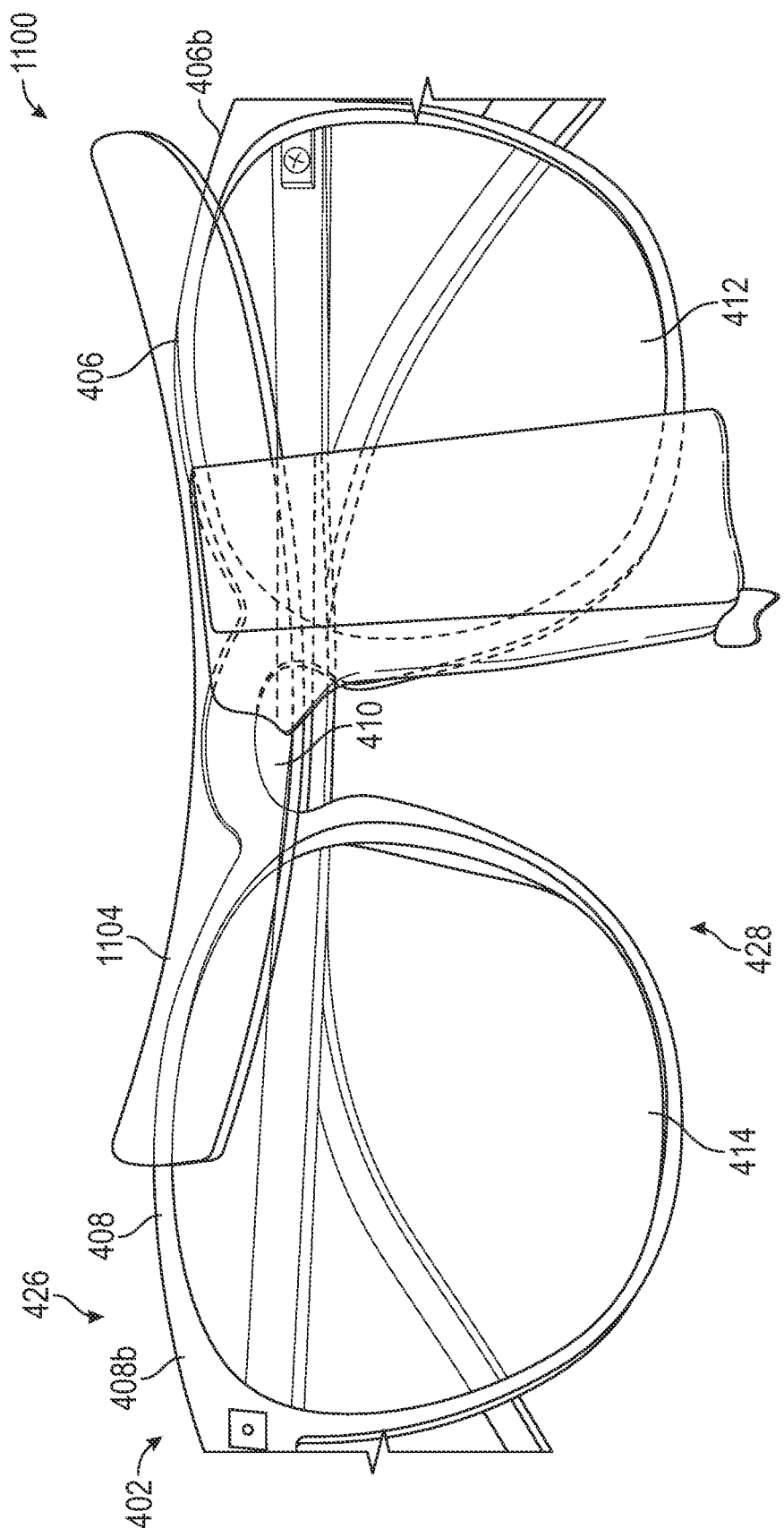
FIG. 13B is a front view of the eye-brain training device of FIG. 13A with the vision obstructor in a second position.
Figure 13C:
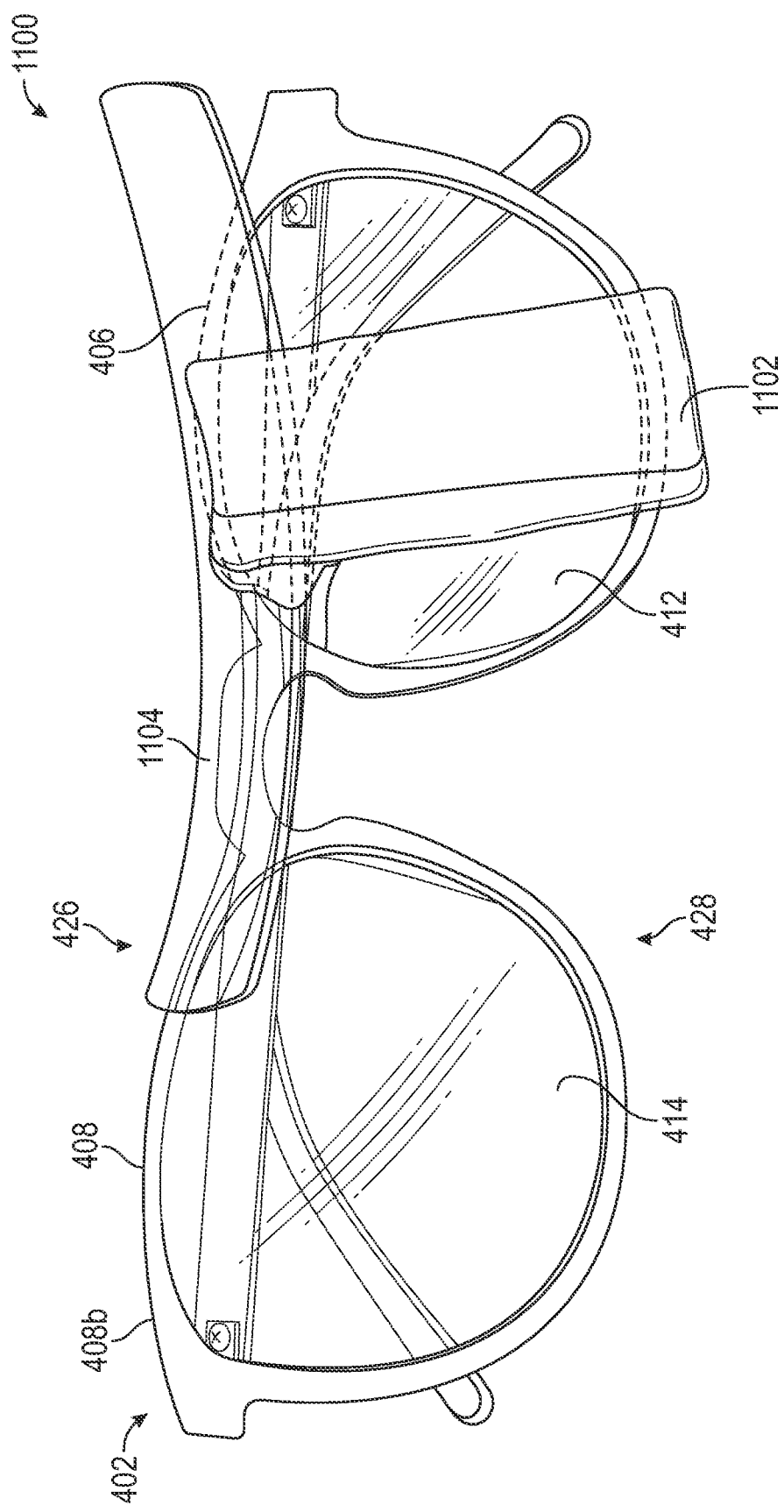
FIG. 13C is a front view of the eye-brain training device of FIG. 13A with the vision obstructor in a third position.

As shown in FIGS. 13A-13C, the obstruction member 1102 can be attached to the article of eyewear 402 by laterally adjustable sleeve 1104. The laterally adjustable sleeve 1104 can comprise a tubular or substantially tubular main body 1106. The tubular main body 1106 can further comprise a slit 1108, which is configured to receive a portion of the article of eyewear 402, such as the top edge portion 426 of the article of eyewear 402. The obstruction member 1102 can be secured to the adjustable sleeve 1104 by any suitable means, including gluing, stitching, or snaps. In some examples, the obstruction member 1102 and the adjustable sleeve 1104 can be formed as a unitary piece.

The obstruction member 1102 can extend downwards from the laterally adjustable sleeve 1104. That is, the obstruction member 1102 can extend between the top edge portion 426 of the article of eyewear 402 towards the bottom end portion 428 of the article of eyewear 402. The obstruction member 1102 thus can extend across a portion of one of the lenses 412, 414 of the article of eyewear 402 as illustrated in FIGS. 13A-13C.

The positioning of the obstruction member 1102 relative to the lateral end portions 406b, 408b of the lens rims 406, 408 can be adjusted by the user by pushing the laterally adjustable sleeve 1104 towards or away from either of the lateral end portions 406b, 408b. For example, if the user desires only to obstruct a relatively small portion of the field of view out of the first lens 412, the laterally adjustable sleeve 1104 can be positioned substantially towards the center of the top edge portion 426 of the article of eyewear 402 (as shown in FIG. 13A). This can leave the obstruction member 1102 overlapping portions of the bridge member 410 of the article of eyewear 402 and the medial end portion 406a of the first lens rim 406.

If a greater degree of obstruction of the field of view out of the first lens 412 is desired, the laterally adjustable sleeve 1104 can be moved laterally towards the lateral end portion 406b of the first lens rim 406 (as shown in FIG. 13B). This positions a greater portion of the obstruction member 1102 over the first lens 412, thus reducing the amount of visual information that can be supplied by the wearer's dominant eye.

Similarly, if it is desired to obstruct a different portion of the field of view out of the first lens 412 (for example, the center portion of the field of view, or the portion of the field of view closer to the lateral end portion 406b of the first lens rim 406), the laterally adjustable sleeve 1104 can be laterally moved further towards the lateral end portion 406b of the first lens rim 406 (as shown in FIG. 13C). This positions the obstruction member 1102 closer to the center of the first lens 412 and obstructs a different portion of the field of view.

It is to be understood that, while FIGS. 13A-13C show the laterally adjustable sleeve 1104 and the obstruction member 1102 being moved from a substantially central position (FIG. 13A) increasingly towards the lateral end portion 406b of the first lens rim 406, the laterally adjustable sleeve 1104 can also be moved towards the lateral end portion 408b of the second lens rim 408. Thus, the obstruction member 1102 can be easily moved between obstructing the field of view out of the first lens 412 and obstructing the field of view out of the second lens 414 without a need for any steps beyond a lateral repositioning of the laterally adjustable sleeve 1104.

When the EBTP device 1100 is worn, the obstruction member 1102 partially obstructs the lens 412, 414 in front of which it is deployed and thus also partially obstructs the view of the wearer's eye looking through the lens 412, 414. Additionally, the obstruction member 1102 may partition the field of view between the wearer's right and left eye, thus reducing the ability of the wearer's dominant eye to compensate for the deficiencies of the wearer's weak eye, as previously described herein in relation to, for example, vision divider 10.

When the view of the wearer's dominant eye is obstructed in this way, the wearer's brain is forced to operate with a limited or partial image from the dominant eye and is therefore forced to increasingly rely on the weak eye. This increased reliance on image information from the weak eye to form a complete field of view forces the brain to use and blend image information from the weak eye with image information to the dominant eye, thus training both the brain and the weak eye to work in closer coordination for providing the wearer a complete field of view.

Because the degree of obstruction of the lens 412, 414 and which lens 412, 414 can be controlled by moving the laterally adjustable sleeve 1104 further towards or away from either lateral end portion 406b, 408b of the first and second lens rims 406, 408 respectively, the field of view through the partially occluded lens 412, 414 can also be adjusted based on the degree of the wearer's amblyopia, and the degree to which it is desirable to force the wearer's brain to rely on image information from the weak eye to supplement image information from the dominant eye. Thus, the EBTP device 1100 can be useful for training users suffering from varying degrees of amblyopia and may be easily adjusted by the wearer.

In some examples, the obstruction member 1102 can comprise a flexible or moldable material such as rubber, foam rubber, silicone, neoprene rubber, polyurethane, or a combination thereof. This allows for slight adjustments for the shape of the obstruction element, and therefore an improved degree of control over the portions of the field of view of the dominant eye which are obstructed or blocked by the obstruction member 1102 when the EBTP device 1100 is worn.

Figure 13D:
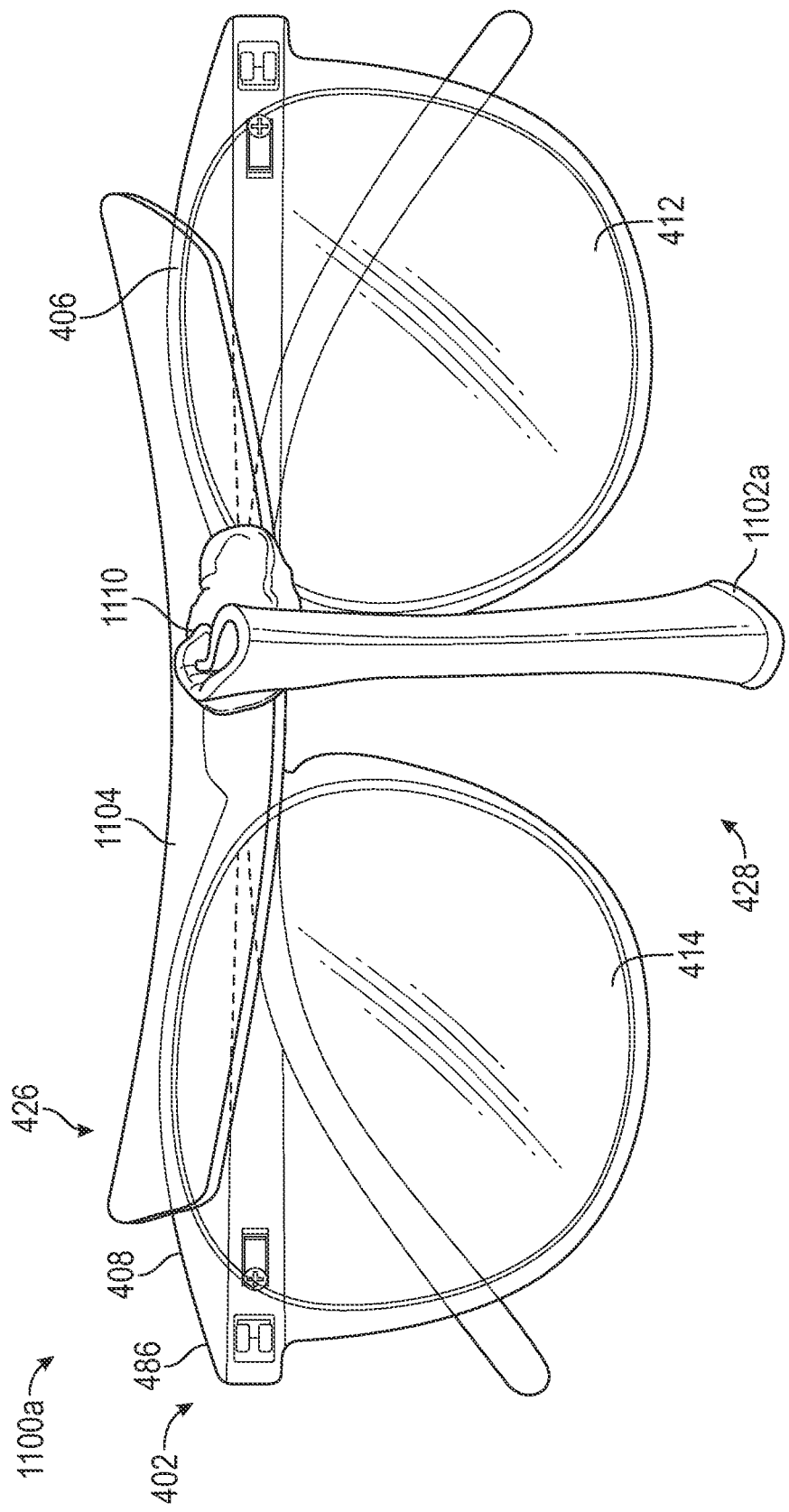
FIG. 13D is a front view of an eye-brain training device according to another example, with a vision obstructor in a perpendicular configuration.

In some examples, such as that shown in FIG. 13D, the EBTP device 1100a can include an obstruction member 1102a affixed to the laterally adjustable sleeve 1104. In such examples, the obstruction member 1102a can extend perpendicularly or substantially perpendicularly from the laterally adjustable sleeve 1104, as illustrated in FIG. 13D, as opposed to the parallel or substantially parallel orientation shown in FIGS. 13A-13C, and described in relation to EBTP device 1100.

When worn by a user, the EBTP device 1100a can function similarly or substantially identically to other vision dividers described herein, such as vision dividers 10 and 100, except for the differences described herein.

Because the obstruction member 1102a is mounted on the laterally adjustable sleeve 1104, it can be positioned further towards the left or the right sides of the article of eyewear 402, such as towards either of the lateral end portions 406b, 408b. This allows the user to readily control the quantity of the field of view of the dominant eye that will be utilized in forming the total field of view image. For example, by moving the obstruction member 1102a closer to the dominant eye, a greater portion of the field of view of the dominant eye will be blocked by the vision divider and will be unavailable for use in forming the total field of view image. Likewise, by moving the obstruction member 1102a further away from the dominant eye, a greater portion of the field of view of the dominant eye will be useable in forming the total field of view image.

In some examples, the obstruction member 1102a can be pivotably attached to the laterally adjustable sleeve 1104 at joint 1110. In some examples, the joint 1110 can comprise a pliable material that permits the obstruction member 1102a to be folded to the left or right relative to the laterally adjustable sleeve 1104. In other examples, the joint 1110 may comprise other suitable pivoting members or hinges, which may be connected to the laterally adjustable sleeve by various methods, including adhesives or clipping, or may be integrally formed with the laterally adjustable sleeve 1104.

In such examples, the obstruction member 1102a can be moved from a parallel (or patch) configuration, such as that shown in FIGS. 13A-13C, and a perpendicular (or vision divider) configuration, as illustrated in FIG. 13D. When the obstruction member 1102 is in the patch configuration, it can lie substantially parallel to the laterally adjustable sleeve 1104 as shown in FIGS. 13A-13C. When the obstruction member 1102 is in the vision divider configuration, it can extend perpendicularly or substantially perpendicularly to the laterally adjustable sleeve 1104.

When the obstruction member 1102a is in the patch configuration, it can obstruct a portion of the field of view of the wearer's dominant eye, as discussed above in relation to EBTP device 1100 and FIGS. 13A-13C. When the obstruction member is in the vision divider configuration, it can separate the field of view of the wearer's dominant eye and the wearer's weak eye, as discussed herein in relation to vision dividers 10, 100.

Thus, in such examples, the EPTP device 1100a can allow a user to readily switch between a patch configuration and a vision divider configuration, according to the needs and preferences of the wearer.

The various EBTP devices described herein thus provide a way for a wearer to passively train the brain to better integrate visual information from both the dominant eye and the weak eye to provide a full field of view. By reducing the degree to which the human brain can rely on visual information from the dominant eye and forcing it to increasingly rely on the weak eye to supply portions of the field of view, the ability of the brain to utilize information from the weak eye can be improved. Thus, the devices described herein provide training for users suffering from amblyopia by conditioning the user for improved eye and brain coordination.

Additional Examples of the Disclosed Technology

In view of the above-described implementations of the disclosed subject matter, this application discloses the additional examples enumerated below. It should be noted that one feature of an example in isolation or more than one feature of the example taken in combination and, optionally, in combination with one or more features of one or more further examples are further examples also falling within the disclosure of this application.

Example 1. An article of eyewear comprising a glasses frame having a first lens rim, second lens rim, and a bridge member extending between the first lens rim and the second lens rim; and a first lens disposed within the first lens rim and a second lens disposed within the second lens rim; and a field of view divider attached to the glasses frame and configured to at least partially obscure the field of view of a user when the article of eyewear is worn.

Example 2. The article of eyewear of claim 1, wherein the field of view divider is a sleeve disposed around a portion of the glasses frame and movable between a deployed configuration and an undeployed configuration, and wherein, when the sleeve is in the deployed configuration, the sleeve partially obscures the first lens.

Example 3. The article of eyewear of claim 2, wherein when the sleeve is in the undeployed configuration, the sleeve is completely disposed over the bridge member of the glasses frame.

Example 4. The article of eyewear of claim 2, wherein the sleeve is an elastic sleeve.

Example 5. The article of eyewear of claim 2, wherein the sleeve is a first sleeve and the article of eyewear further comprises a second sleeve configured to partially obscure the lens, such that when the first sleeve is in the deployed configuration, the first sleeve and the second sleeve define a gap through which the first lens is exposed.

Example 6. The article of eyewear of claim 5, wherein the first sleeve and the second sleeve are elastic sleeves.

Example 7. The article of eyewear of claim 1, wherein the field of view divider comprises a rigid projection mounted on a swivel and configured to be rotatably positioned relative to the lens and to partially obscure the lens.

Example 8. The article of eyewear of claim 7, wherein the swivel is attached to the glasses frame by a clip attached to a bridge member of the glasses frame.

Example 9. The article of eyewear of claim 7, wherein when the rigid projection is rotatably positioned relative to the lens, a greater or lesser portion of the lens will be obscured.

Example 10. The article of eyewear of claim 1, wherein the field of view divider comprises a projection extending from a front portion of the glasses frame.

Example 11. The article of eyewear of claim 10, wherein the field of view divider is a rigid member extending from a front of an end portion of the first lens rim.

Example 12. The article of eyewear of claim 11, wherein the rigid member is attached to a rotatable arm, and the rotatable arm is attached to the glasses frame, such that the rigid member can be rotated in at least a first rotational direction relative to the glasses frame.

Example 13. The article of eyewear of claim 10, wherein the field of view divider is a flexible projection extending from a front of an end portion of the first lens rim.

Example 14. The article of eyewear of claim 13, wherein the field of view divider is attached to the glasses frame with a pliable loop, wherein the pliable loop is configured to be closed by a snap or fastener.

Example 15. A vision training device, comprising an article of headgear and an obstructor comprising a horizontal member affixed to the article of headgear and a vertical member extending from the horizontal member, wherein the vertical member is configured to extend along a nose of a user when the article of headgear is worn.

Example 16. The vision training device of claim 15, wherein the vertical member has a thickness, and the thickness of the vertical member obstructs or partially obstructs the vision of a right eye of the user to a left side of the vertical member or the vision of a left eye of the user to a right side of the vertical member.

Example 17. The vision training device of claim 16, wherein the vertical member has a thickness of greater than 5 mm.

Example 18. The vision training device of claim 16, wherein the vertical member has a thickness of between 1 mm and 5 mm.

Example 19. The vision training device of claim 15, wherein the article of headgear is a hat.

Example 20. The vision training device of claim 15, wherein the article of headgear is a headband.

Example 21. The vision training device of claim 15, wherein the article of headgear is a golf visor.

Example 22. A nasal prosthetic, comprising first prosthetic layer having a first thickness, a front side, and a back side; and an adhesive layer disposed on the back side of the first prosthetic layer; wherein the nasal prosthetic is configured to be worn against a nasal bridge of a user with the back side of the nasal prosthetic facing the nasal bridge of the user; wherein when the nasal prosthetic is worn, the adhesive layer secures the first prosthetic layer to the nasal prosthetic; and wherein the first prosthetic layer at least partially obscures a field of view of a left eye or a right eye of the user.

Example 23. The nasal prosthetic of claim 22, wherein the first prosthetic layer extends along a dorsum nasi of the user when the nasal prosthetic is worn.

Example 24. The nasal prosthetic of claim 22, further comprising a second prosthetic layer disposed against the first prosthetic layer.

Example 25. The nasal prosthetic of claim 24, wherein the second prosthetic layer extends along the nasal bridge when the nasal prosthetic is worn, such that the first prosthetic layer is between the nasal bridge and the second prosthetic layer.

Example 26. An eye brain training process device, comprising a tubular member having a first end portion, a second end portion, a wall portion, a lumen extending from the first end portion to the second end portion, and an axial slit extending through the wall portion and extending from the first end portion to the second end portion; and a vision obstructor attached to the tubular member and extending tangentially away from the tubular member; wherein the tubular member is configured to receive an edge portion of an article of eyewear such that the vision obstructor is positioned along a front portion of the article of eyewear, and wherein the position of the vision obstructor relative to the article of eyewear can be adjusted laterally relative to the article of eyewear by moving the tubular member laterally.

Example 27. The eye brain training process device of claim 26, wherein the tubular member is curved or arced.

Example 28. The eye brain training process device of claim 26, wherein the vision obstructor is a fabric patch.

Example 29. The eye brain training process device of claim 26, wherein the vision obstructor is a rigid member.

Example 30. The eye brain training process device of claim 26, wherein the article of eyewear is a pair of glasses, sunglasses, or goggles.

Example 31. An eye brain training process device, comprising a vision obstructor and a brace configured to attach the vision obstructor to an article of eyewear; wherein the brace is configured to receive an edge portion of the article of eyewear such that the vision obstructor is positioned along a front portion of the article of eyewear, wherein the vision obstructor is movable between a first configuration in which the vision obstructor extends laterally along a lens of the article of eyewear and a second configuration in which the vision obstructor extends frontally from the article of eyewear.

Example 32. The eye brain training process device of claim 31, wherein the position of the vision obstructor relative to the article of eyewear can be adjusted laterally relative to the article of eyewear by moving the brace laterally along the edge portion of the article of eyewear.

Example 33. The eye brain training process device of claim 31, wherein the brace comprises a hinge that allows the vision obstructor to move between the first configuration and the second configuration.

Example 34. The eye brain training process device of claim 31, wherein the brace comprises a pliable material that allows the vision obstructor to move between the first configuration and the second configuration.

Example 35. The eye brain training process device of claim 31, wherein the brace comprises a tubular member with a slit configured to receive the edge portion of the article of eyewear.

The features described herein with regard to any example can be combined with other features described in any one or more of the examples, unless otherwise stated. In view of the many possible ways in which the principles of the disclosure may be applied, it should be recognized that the illustrated configurations depict examples of the disclosed technology and should not be taken as limiting the scope of the disclosure nor the claims. Rather, the scope of the claimed subject matter is defined by the following claims and their equivalents.

The invention claimed is:

1. An article of eyewear comprising:
a glasses frame having a first lens rim, second lens rim, and a bridge member extending between the first lens rim and the second lens rim;
a first lens disposed within the first lens rim and a second lens disposed within the second lens rim; and
a field of view divider attached to the glasses frame and configured to at least partially obscure the field of view of a user when the article of eyewear is worn;
wherein the field of view divider is a sleeve disposed around a portion of the glasses frame and movable between a deployed configuration and an undeployed configuration,
wherein, when the sleeve is in the deployed configuration, the sleeve partially obscures the first lens;
wherein the sleeve is a first sleeve and the article of eyewear further comprises a second sleeve configured to partially obscure the lens, such that when the first sleeve is in the deployed configuration, the first sleeve and the second sleeve define a gap through which the first lens is exposed.

2. The article of eyewear of claim 1, wherein the first sleeve and the second sleeve are elastic sleeves.

3. An article of eyewear comprising:
a glasses frame having a first lens rim, second lens rim, and a bridge member extending between the first lens rim and the second lens rim;
a first lens disposed within the first lens rim and a second lens disposed within the second lens rim; and
a field of view divider attached to the glasses frame and configured to at least partially obscure the field of view of a user when the article of eyewear is worn;
wherein the field of view divider is a rigid member extending from a front of an end portion of the first lens rim;
wherein the rigid member is attached to a rotatable arm, and the rotatable arm is attached to the glasses frame, such that the rigid member can be rotated in at least a first rotational direction relative to the glasses frame.

4. An article of eyewear comprising:
a glasses frame having a first lens rim, second lens rim, and a bridge member extending between the first lens rim and the second lens rim;
a first lens disposed within the first lens rim and a second lens disposed within the second lens rim; and
a field of view divider attached to the glasses frame and configured to at least partially obscure the field of view of a user when the article of eyewear is worn;
wherein the field of view divider is a flexible projection extending from a front of an end portion of the first lens rim wherein the field of view divider is a flexible projection extending from a front of an end portion of the first lens rim;
wherein the field of view divider is attached to the glasses frame with a pliable loop, wherein the pliable loop is configured to be closed by a snap or fastener.

5. An eye brain training process device, comprising:
a vision obstructor; and
a brace configured to attach the vision obstructor to an article of eyewear;
wherein the brace is configured to receive an edge portion of the article of eyewear such that the vision obstructor is positioned along a front portion of the article of eyewear;
wherein the vision obstructor is movable between a first configuration in which the vision obstructor extends laterally along a lens of the article of eyewear and a second configuration in which the vision obstructor extends frontally from the article of eyewear;
wherein the brace comprises a tubular member with a slit configured to receive the edge portion of the article of eyewear.

* * * * *